US009781387B2

(12) United States Patent
Bright-Thomas

(10) Patent No.: US 9,781,387 B2
(45) Date of Patent: Oct. 3, 2017

(54) SPLIT FRAME MULTISTREAM ENCODE

(71) Applicant: Cisco Technology, Inc., San Jose, CA (US)

(72) Inventor: Paul G. Bright-Thomas, Wokingham (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/089,649

(22) Filed: Apr. 4, 2016

(65) Prior Publication Data

US 2016/0219250 A1    Jul. 28, 2016

Related U.S. Application Data

(63) Continuation of application No. 14/798,936, filed on Jul. 8, 2015, which is a continuation of application
(Continued)

(51) Int. Cl.
*H04N 7/14* (2006.01)
*H04N 7/15* (2006.01)
(Continued)

(52) U.S. Cl.
CPC ............ *H04N 7/152* (2013.01); *H04N 19/00* (2013.01); *H04N 19/40* (2014.11); *H04N 19/59* (2014.11); *H04N 19/88* (2014.11)

(58) Field of Classification Search
CPC ........ H04N 19/00; H04N 19/40; H04N 19/59; H04N 19/88; H04M 3/56–3/569; H04M 2203/50–2203/509
(Continued)

(56) References Cited

U.S. PATENT DOCUMENTS 6,529,146 B1 *   3/2003   Kowalski ............... H03M 7/00
                                                     341/50
7,394,481 B2 *   7/2008   Wang .................... H04N 7/152
                                                     348/14.08
(Continued)

FOREIGN PATENT DOCUMENTS

WO          03049418 A2     6/2003
WO       2005079068 A1     8/2005

OTHER PUBLICATIONS

Mathias Johanson, "Scalable Video Conferencing Using Subband Transform Coding and Layered Multicast Transmission", Swedish Research Institute for Information Technology, Oct. 1999, 5 pages.
(Continued)

*Primary Examiner* — Hemant Patel
(74) *Attorney, Agent, or Firm* — Edell, Shapiro & Finnan, LLC

(57) ABSTRACT

Techniques for video conferencing include receiving a stream of video slices from a participant, designating the video slices as a primary sub-picture of a frame of video, encoding, with a first encoder, a first secondary sub-picture of the frame of video to obtain an encoded first secondary sub-picture of a frame of video, encoding, with a second encoder, a second secondary sub-picture of the frame of video to obtain an encoded first secondary sub-picture of a frame of video, combining the primary sub-picture with the encoded first secondary sub-picture to obtain a first video stream, combining the primary sub-picture with the encoded second secondary sub-picture to obtain a second video stream, and transmitting the first and second video streams to respective recipients.

18 Claims, 17 Drawing Sheets

Related U.S. Application Data

No. 13/832,689, filed on Mar. 15, 2013, now Pat. No. 9,118,807.

(51) Int. Cl.
  *H04N 19/00* (2014.01)
  *H04N 19/40* (2014.01)
  *H04N 19/59* (2014.01)
  *H04N 19/88* (2014.01)

(58) Field of Classification Search
  USPC ............ 348/14.01–14.16; 370/259–271, 370/351–357; 379/202.01–207.01; 709/201–207, 217–248
  See application file for complete search history.

(56) References Cited

U.S. PATENT DOCUMENTS

| | | | |
|---|---|---|---|
| 2004/0008249 A1* | 1/2004 | Nelson | H04N 7/152 348/14.09 |
| 2005/0008240 A1 | 1/2005 | Banerji et al. | |
| 2009/0160929 A1 | 6/2009 | Wu et al. | |
| 2009/0234919 A1* | 9/2009 | Jefremov | H04L 43/0894 709/204 |
| 2012/0127262 A1 | 5/2012 | Wu et al. | |
| 2015/0312521 A1 | 10/2015 | Bright-Thomas | |

OTHER PUBLICATIONS

International Search Report and Written Opinion in International Application No. PCT/US2014/030254, mailed Jul. 15, 2014, 11 pages.

\* cited by examiner

SPLIT FRAME MULTISTREAM ENCODE

CROSS-REFERENCE TO RELATED APPLICATION

This application is a continuation of U.S. application Ser. No. 14/793,936, filed Jul. 8, 2015, which is a continuation of application Ser. No. 13/832,689, filed Mar. 15, 2013, now U.S. Pat. No. 9,118,807, the entireties of which are incorporated herein by reference.

TECHNICAL FIELD

The present disclosure relates generally to techniques for implementing video conferencing.

BACKGROUND

Video conferences can be configured in a variety of manners, including switched or transcoded video and the view of the conference provided may be single-participant or continuous presence.

In a switched video scenario, a multi-participant video conference can be conducted by switching the video from a primary participant to all other participants, with the designated primary participant able to change during the course of the conference. Typically, the primary participant is the active speaker in the conference as determined by analysis of the contributed audio, and may change during the course of the conference. The primary participant may be determined in other ways besides determining the participant with the maximum audio level, such as by a fixed conference role or by token passing (the primary participant passes a token to another participant, who then becomes the primary participant).

In the switched video scenario, the primary participant receives switched video from one of the other participants so that they are not viewing themselves while speaking, since this may be distracting and may expose the latency of communication between participants. To avoid these effects, self-view suppression is desirable.

In a switched video scenario with a single video stream, the active participant is the only conference participant visible to others, and the conference lacks a group feel, or even a visual representation of who else is actually in the conference. A more satisfactory conference experience is achieved with a continuous presence configuration, in which a conference view is composed for each secondary participant, showing the primary participant and others, but excluding themselves. The continuous presence experience may be composed locally at an endpoint that receives multiple video streams (one stream per displayed participant) but this requires a capability in the receiving endpoint of decoding multiple video streams and composing the decoded video. Alternatively, a transcoding multipoint control unit (MCU) may decode individual streams from participants and compose the resulting video streams into a single view of the conference suitable for display to a specific conference participant (not showing that participant), doing this multiple times for multiple conference participants. This view is then encoded uniquely for that participant alone, providing a dedicated view of the conference. This approach based on the "transcoding" of compressed video streams may employ more image processing and video encoding resources than the switched video scenario described above, but completely decouples each participant's conference experience from all others. It also allows for simple endpoints that handle only a single video stream to receive a complex composed experience of the video conference, concentrating processing resources in the conference center.

DESCRIPTION OF EXAMPLE EMBODIMENTS

Overview

Figure 1:
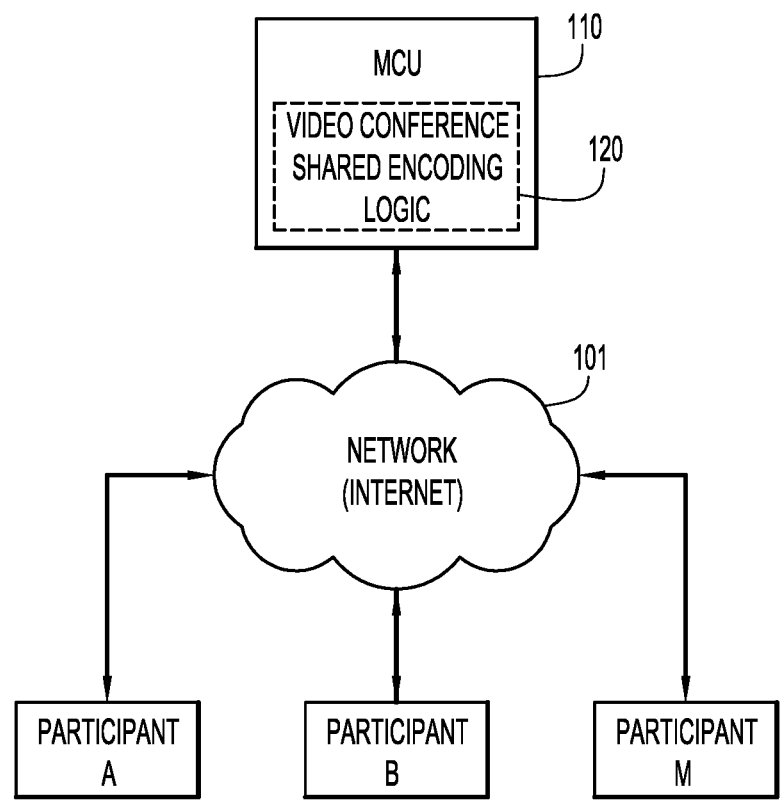
FIG. 1 is a block diagram of a video conference system over a network that may utilize a transcoding multipoint control unit (transcoder/MCU) that includes a shared encoder and plural non-shared encoders according to the techniques described herein.

Presented herein are techniques to encode video into multiple video streams that are sent to a plurality of recipients, such as video conference participants, in which the property of self-view suppression is maintained for each recipient, and yet a proportion of the content of the encoded multiple video streams is encoded in common for transmission to multiple recipients.

According to one technique, a method includes encoding, with a shared encoder, a primary sub-picture of a frame of video to obtain an encoded primary sub-picture of the frame of video, encoding, with a first non-shared encoder, a first secondary sub-picture of the frame of video to obtain an encoded first secondary sub-picture of the frame of video, encoding, with a second non-shared encoder, a second secondary sub-picture of the frame of video to obtain an encoded second secondary sub-picture of the frame of video, wherein the second secondary sub-picture is different from the first secondary sub-picture, combining the encoded primary sub-picture with the encoded first secondary sub-picture to obtain a first video stream, combining the encoded primary sub-picture with the encoded second secondary sub-picture to obtain a second video stream, and transmitting the first and second video streams to respective recipients.

Example Embodiments

Techniques described in detail below compose video streams contributed by multiple conference participants into a continuous presence conference view, which delivers a more informative view of conference participation than viewing a single switched participant. In order to prevent a participant from seeing themselves ("self-view"), which is a distraction and also exposes the latency of the video and audio channels used, the conference view for each participant is uniquely composed and then encoded, and then sent out to each participant for viewing by the participant.

Based on the techniques described in detail below, the amount of media-processing resources required to furnish a set of video conference participants with independent streams showing other participants in a continuous presence view of the conference can be reduced by using a multi-stream (or shared) encoder that generates common slice data for the parts of the conference view that are common to each participant, with per-participant slice data for the regions that are unique to each participant. As a result, encoding resources within a video conference grow less rapidly than the number of participants added to the conference, reaching a limit independent of how many participants are in the conference.

The shared encoding techniques described below are applicable to a video conference system that uses a transcoder/MCU with plural continuous presence conference view layouts, of which the Cisco TelePresence (TP) server is one such transcoder/MCU.

In the techniques described below, encoding resources are shared amongst recipients of composed continuous presence views of a video conference, with no participant receiving a view that includes themselves (i.e., self-view suppression is attained). This may be implemented in a video conference in which all participants are capable of receiving a common video resolution encoded with a common codec, or it may be implemented in a video conference in which participants have different codec characteristics, in which each participant is placed into a subconference of the video conference in which other participants in that subconference have the same or similar codec characteristics.

An improved video conference experience over switched video is achieved through the use of "continuous presence", in which video streams from some or all of the conference participants are decoded and combined into a new scene that shows both the active speaker as a "primary" participant and some or all of the other participants as "secondary" participants. Additional participants presently off-screen are classified as "tertiary" participants. Any participant may be elevated to primary classification if they become the active speaker in the conference. A tertiary participant may be elevated to secondary participant if the number of displayed secondary participants increases in the configuration of the conference view, or if a secondary participant leaves the conference. The inclusion of a view of multiple participants gives a more natural conference experience in which the reactions of others to the active speaker can be seen. If the composed view contains at most M secondary participants out of N in the conference (M and N both integer values, with M<N), then there are at most M+1 secondary participants, plus the primary participant, that are visible to others in the conference, and N−M−2 participants (corresponding to tertiary participants) that are not seen by others.

A fully transcoded continuous presence configuration, as described earlier, has the benefits of participant control over conference experience, and error recovery for each participant independent of all others. A centralized transcoder/MCU can be used to support continuous presence video conferencing, in which a conference server receives media streams (e.g., video and/or audio) from endpoints corresponding to conference participants, mixes the streams, and sends individual streams back to the endpoints for playback at those endpoints.

Per-participant encoding is extremely useful in providing an optimized conference experience to participants that have mixed media capabilities (different resolutions and/or codec characteristics). However, where common video capabilities exist among participants, a more cost-effective experience could be provided by switching of single streams from source, or by transcoding composition of a single common view to all participants. Yet the first of these lacks the continuous presence view (achievable by the switching of multiple streams between participants) and the second does not achieve self-view suppression; both are significant omissions on the fully-transcoded conference experience.

As described above, transcoding of video conferencing streams to continuous presence conference views with self-view suppression conventionally employs a unique video encode for each participant, resulting in a large amount of encoding resources. Transcoding conferences can be more cost-effective and can be achievable on smaller platforms (e.g., a transcoder/MCU having lesser processing capabilities) if the amount of encoding resource is reduced.

Techniques are described herein that encode multi-participant conference views without the expenditure of multiple composing and encoding of multiple video streams, yet at the same time retain the property of self-view suppression.

In order to provide a better understanding of the various techniques described herein, a brief description of video encoding is provided below.

Current and upcoming video compression standards (for example, ITU-T standards H.264 and H.265, respectively) divide a picture into small coding blocks, called macroblocks for H.264 and coding units for H.265, with the blocks covering the picture in a row-by-row raster scan from top left to bottom right (H.265 also supports other block scan patterns). A contiguous set of blocks from the raster scan may be coded as a slice, which has a defined set of coding parameters and can be decoded independently of other slices. In Internet Protocol (IP) video conferencing, slices can be generated to match a target packet size, or alternatively smaller slices can be aggregated into a single packet and larger slices can be fragmented into multiple packets.

A common format for a multi-participant continuous presence view of a conference is for the active speaker as primary participant to be given a dominant portion of the encoded picture, with up to M secondary participants shown as a row of reduced-scale inserts (e.g., thumbnail views) at either the top or bottom of the picture. If the secondary participants are superimposed on top of the view of the primary participant, these inserts are referred to as Picture-in-Picture, or PiPs. If the secondary participants are shown above or below the primary participant without superposition, these inserts are referred to as Picture-out-of-Picture, or PoPs. In either case, a good continuous presence view uses a proportion of only 10-20% of the picture area at either the top or bottom of the picture to show up to approximately 10 secondary participants (e.g., from one to ten secondary participants). The encoded picture may be viewed as composed of primary and secondary sub-pictures, with a horizontal boundary between them; where the set of PiPs or PoPs is composed into a strip that does not span the entire width of the picture, there may be common picture content across this horizontal boundary, but the logical boundary can be imposed nonetheless. In the techniques described below, this horizontal boundary is vertically aligned to a boundary between two contiguous block rows of a frame, in which the primary and secondary-sub-pictures of the frame are encoded from independent sets of slices.

Each slice encoded by an encoder includes information specifying where that slice exists in a frame, and information regarding the type of encoding performed on raw video data to obtain that slice (i.e., this information may be included as overhead bits of the slice). One slice may correspond to a portion of a row of a frame, another slice may correspond to a full row of a frame, and another slice may correspond to multiple rows of a frame, for example. The arrangement of slices for a particular picture is determined by the encoder, and in the following, slices are defined to lie wholly on one side or the other of the horizontal boundary between sub-pictures.

Taking the case of participants viewing in common a continuous presence layout with secondary participant PiPs shown in a minority-area sub-picture at top or bottom of the conference view, each of M secondary participants receives their own unique packet stream formatted with appropriate Real-time Transport Protocol (RTP) and encryption parameters, yet with some slice data in common. The slice data for the majority part of the picture area showing the primary participant (the primary sub-picture) can be generated in common for the M secondary participants by a single shared encoder. Also, the slice data for the secondary sub-picture that corresponds to the remainder of the picture area can be generated uniquely for each secondary participant, from a composed secondary sub-picture that shows some or all of the M−1 secondary participants but that suppresses the self-view for each.

The creation of a shared primary sub-picture and a unique secondary sub-picture for each secondary participant provides for each video stream produced from the video conference being the product of multiple encoders based on common sequence parameters, with the encode of the primary sub-picture covering the majority of the coded picture area, and a participant-specific secondary sub-picture encode performed uniquely for each participant. If derived under common sequence and picture parameter set values, and using consistent reference picture buffer state and reference picture list reordering, the slices from these two separate encodes can be concatenated and issued as a standards-compliant video bitstream (e.g., H.264 or H.265) for transmission to each individual participant for which it was prepared.

From the perspective of the decoder (i.e., codec) provided at each participant's location, that decoder does not know that the video data that it receives is actually created by two separate encoders, and then concatenated or combined in some manner at a central server (or other device) prior to being sent as packets to the participant. To allow for the decoder to operate properly (e.g., to be able to decode the video stream properly for display at each participant), the encoding processes that separately produce encoded slices of the primary and secondary sub-pictures at the central server are made aware of the sub-picture structure (e.g., where the boundary is provided on the frame of video data that includes a primary sub-picture region and a secondary sub-picture region), and impose a constraint on motion compensated prediction that no motion vectors within the encoded slices can cross the sub-picture boundary; the other principal prediction mechanism—intra prediction—is already constrained to not cross slice boundaries, and so naturally observes the independence of primary and secondary sub-pictures. This constraint allows any decoder receiving the video streams to decode the slices of the common primary sub-picture without a dependence on the remainder of the picture that differs for every participant.

FIG. 1 is a block diagram showing a video conference system for which video and audio data is provided to participants A, B, . . . , M of the video conference over a network 101, which may correspond to the Internet, a local area network (LAN), or a wide area network (WAN), for example. An MCU 110 receives video and audio data from each of the participants A, B, . . . , M, processes that data, and outputs video and audio to each of the participants A, B, . . . , M. For example, the video output to all but one of the participants A, B . . . , M may include video of the primary participant (e.g., the current speaker), in which the participant who is the primary participant does not receive video of himself/herself, but rather the primary participant receives video of some other participant (e.g., the previous primary participant). MCU 110 includes video conference shared encoding logic 120 that enables the MCU 110 to scale, compose, encode, and transmit an aggregated, yet customized or unique video stream, to each of the participants A, B, . . . , M.

Figure 2:
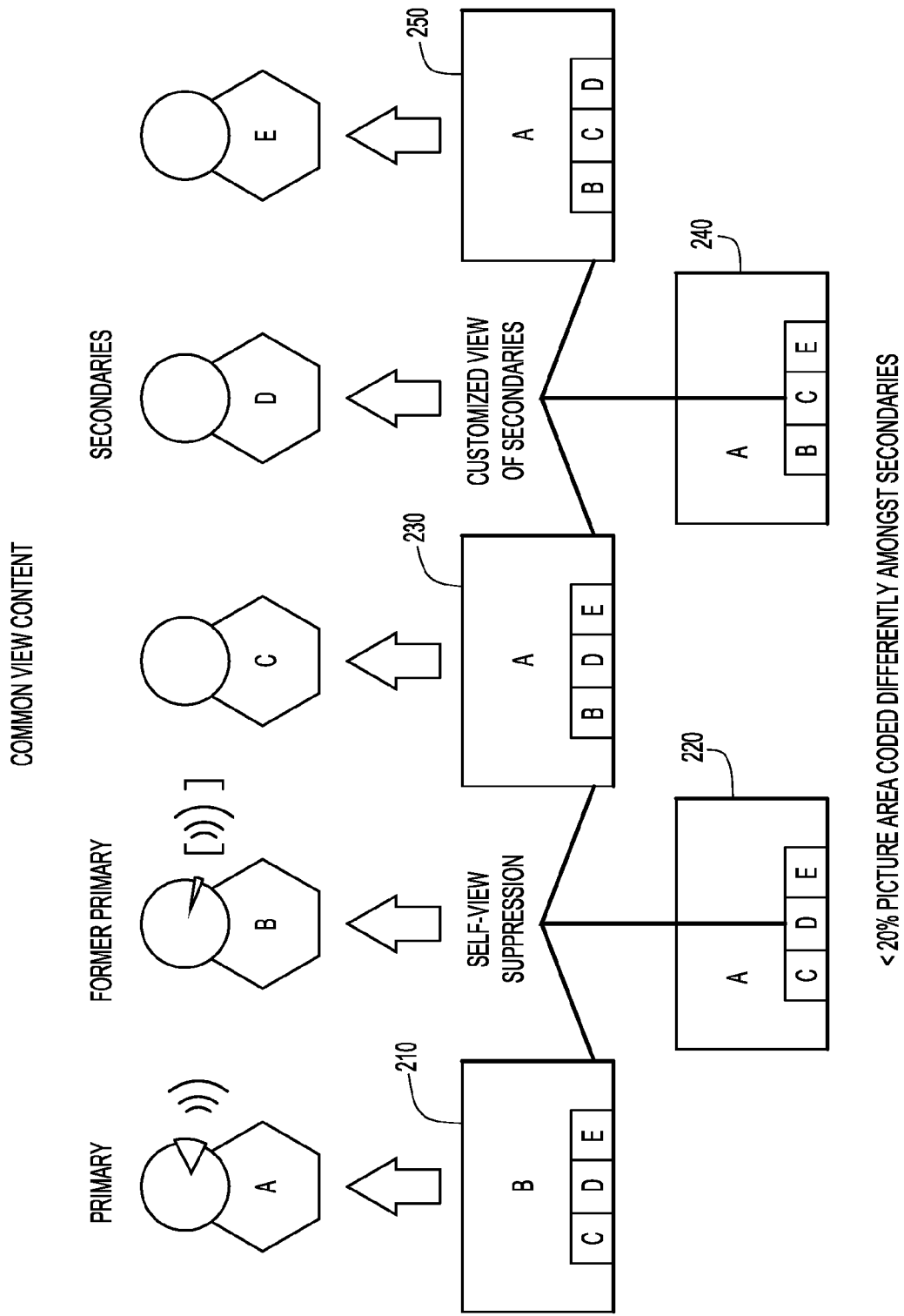
FIG. 2 illustrates common view content provided to different participants of a video conference for which content is provided by way of a transcoder/MCU according to the techniques described herein.

FIG. 2 shows a video conference with five participants A, B, C, D, E, in which A is the primary participant, B is the former primary participant, C, D, E are secondary participants, and in which common view content is provided to the video conference participants in accordance with techniques described herein. Participant A is provided with a frame 210 in which video of former primary participant B is provided in the primary sub-picture region and video of secondary participants C, D, E is provided in the secondary sub-picture region of the frame 210. Participant B, the former primary participant, is provided with a frame 220 in which video of primary participant A is provided in the primary sub-picture region and video of secondary participants C, D, E is provided in the secondary sub-picture region of the frame 220. Participant C, a secondary participant, is provided with a frame 230 in which video of primary participant A is provided in the primary sub-picture region and video of secondary participants B, D, E is provided in the secondary sub-picture region of the frame 230. Participant D, a secondary participant, is provided with a frame 240 in which video of primary participant A is provided in the primary sub-picture region and video of secondary participants B, C, E is provided in the secondary sub-picture region of the frame 240. Participant E, also a secondary participant, is provided with a frame 250 in which video of primary participant A is provided in the primary sub-picture region and video of secondary participants B, C, D is provided in the secondary sub-picture region of the frame 250. Thus, none of the participants sees video of himself/herself, and each participant is provided with video of the primary participant (or previous primary if they are themselves the primary) and a set of secondary participants in order to establish a more complete experience for the video conference that the participant is attending. The size of the set of viewed secondary participants may be increased up to a limit beyond which the visibility of secondary participants would be impaired. Beyond this size, additional conference participants would be ranked as tertiary, would see a view only of primary and secondary participants, not themselves be visible to any participants. Assignments as primary, secondary and tertiary may be made dynamically as participation in the conference evolves.

Figure 3:
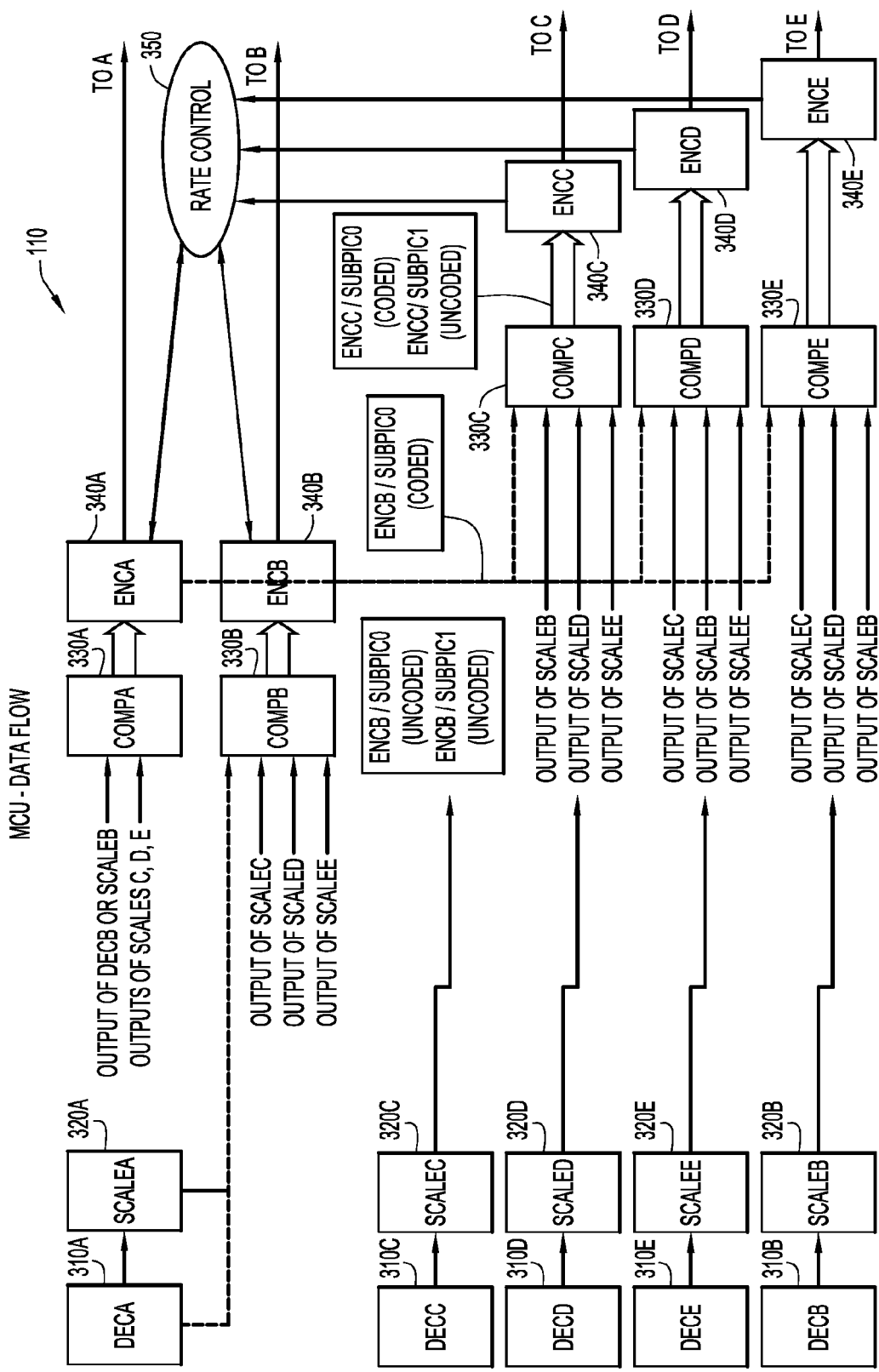
FIG. 3 is a block diagram of data flow in a transcoder/MCU that includes scaling, composing and encoding of video data according to the techniques described herein.

FIG. 3 is a block diagram illustrating data flow of a transcoder/MCU 110 that can create shared video streams in accordance with techniques described herein. In one implementation, transcoder/MCU 110 includes decoders 310A, 310B, 310C, 310D, 310E that respectively decode video data output by codecs provided at respective locations of participants A, B, C, D, E. The output of decoders 310A, 310B, 310C, 310D, 310E respectively corresponds to decoded uncompressed (e.g., raw) versions of video streams output by codecs of participants A, B, C, D, E.

The raw video streams may be scaled by scalers 320A, 320B, 320C, 320D, 320E, which scale the raw video to fit within a particular region of a video frame. For example, scalers 320A, 320B, 320C, 320D, 320E may change the resolution of the decoded uncompressed video streams, such as by expanding or reducing a decoded video stream in one or both dimensions, so that the video can fit into a predetermined space within a frame (or a portion of the scaled stream can be used to fit a space within a frame). If the video is expanded or reduced in both dimensions by scalers 320A, 320B, 320C, 320D, 320E, it can be done by the same scale factor, so that the aspect ratio of the video can be preserved. It should be noted that the simplest case is that all participant contribution and distribution resolutions are the same; in that case, the scalers need only produce the reduced scale views of secondaries shown in the secondary sub-picture. The primary sub-picture views of participants A and B could be obtained directly from the decoders, and used without scaling. If the contribution resolution were not correct for use in the primary sub-pictures, then separate scales (performed by separate scaler objects) would be used. This so-called simplest case is depicted in FIG. 3 by nothing that the input to CompA can be directly from DecB and using a dashed line between DecA and CompB.

The scaled video output of scalers 320A, 320B, 320C, 320D, 320E is made available to composers 330A, 330B, 330C, 330D, 330E, which copy each frame of its input video stream into a defined space within a video frame it is composing; the composed video frame integrates multiple input video streams into a single view of a set of conference participants. Composer 330B, which is the composer for former primary participant B, composes a video frame to be sent to former primary participant B, in which the video frame includes a primary sub-picture portion that corresponds to, for example, 80% of the video frame and a secondary sub-picture portion that corresponds to, for example, 20% of the video frame. Composer 330B places the scaled video of primary participant A into the primary sub-picture portion of the video frame, and the scaled video of secondary participants C, D, E into separate locations within the secondary sub-picture portion of the video frame (see also FIG. 2), effectively completing a template corresponding to the desired frame structure (layout) of frames 210, 220, 230, 240, 250 shown in FIG. 2, for example.

The output of composer 330B is an unencoded video stream, which is encoded by encoder 340B into primary sub-picture encoded data and into secondary sub-picture encoded data of a frame. As will be explained in more detail, encoder 340B corresponds to a "shared" encoder, in that the primary sub-picture encoded data output by encoder 340B is also provided to composers 330C, 330D, 330E, to use in creating composed video frames to be sent to participants C, D, E (and thus is "shared" encoded data to be used in each of the frames to be sent to participants C, D, E).

As shown in FIG. 3, the primary sub-picture encoded data output by encoder 340B may correspond to one or more slices of encoded data. The primary sub-picture encoded data output by encoder 340B is not encoded again, but rather is passed on by composers 330C, 330D, 330E to their respective encoders 340C, 340D, 340E. This is done by the adaptation of the idea of frame composition from the simple process described above for composer 330B; in the revised process, composition can accept a sub-picture region input as pre-fulfilled coded data, or conventional raw unencoded picture data. Coded and unencoded sub-pictures are both passed on to the connected encoder. Encoders 340C, 340D, 340E pass through, and do not process, the primary sub-picture encoded data output by encoder 340B (as forwarded to them by composers 330C, 330D, 330E within composed frames output by those composers), which is to be used as video for primary sub-picture portions of frames to be sent to participants C, D, E. That is, encoders 340C, 340D, 340E only encode the secondary sub-picture portions of the frames to be sent to participants C, D, E, as composed by composers 330C, 330D, 330E.

In more detail, composer 330C composes the secondary sub-picture portion of a video frame to be sent to participant C by receiving and placing scaled video of participants B, D, E into their proper positions within a template of a secondary sub-picture portion of a frame to be sent to participant C, while also placing the encoded sub-picture portion of participant A as output by encoder 340B into a primary sub-picture portion of the frame to be sent to participant C. Encoder 340C receives the composed video data output by composer 330C, and only encodes the scaled video of participants B, D, E that is provided in the secondary sub-picture portion of the composed video data into one or more slices. The encoded secondary sub-picture portion of the frame to be provided to participant C, as encoded by encoder 340C, is concatenated (as will be described in detail in connection with FIG. 4) with the encoded sub-picture portion of participant A (as output by encoder 340B and as passed through to encoder 340C by composer 330C) into a single video frame, for output to participant C.

As discussed above, the decoder of participant C (part of the codec at participant C) receives the composed and encoded video data output by encoder 340C, and decodes it as if the video data was created by a single encoder and not by multiple encoders (in this case, two). In order to allow the decoder to decode video frames that include encoded data from more than one encoder (e.g., the video frames sent to participant C include encoded data output by shared encoder 340B and encoded data output by non-shared encoder 340C, which are combined into a frame and packetized prior to being sent to participant C), the encoding performed by the encoders is controlled such that no motion vectors cross the boundary separating the primary sub-picture portion and the secondary sub-picture portion of the frame. A boundary separating the primary sub-picture portion and the secondary sub-picture portion of the frame is known beforehand by encoders 340A, 340B, 340C, 340D, 340E, in which those encoders ensure that the slices of encoded video data that they output adjacent to that boundary do not refer to motion vectors that cross the boundary (since that video data is to be provided by another encoder). A controller 350 performs rate control for encoders 340A, 340B, 340C, 340D, 340E, to cause the outputs of encoders 340A, 340B, 340C, 340D, 340E to be within an acceptable bit rate for the video conference.

Figure 4:
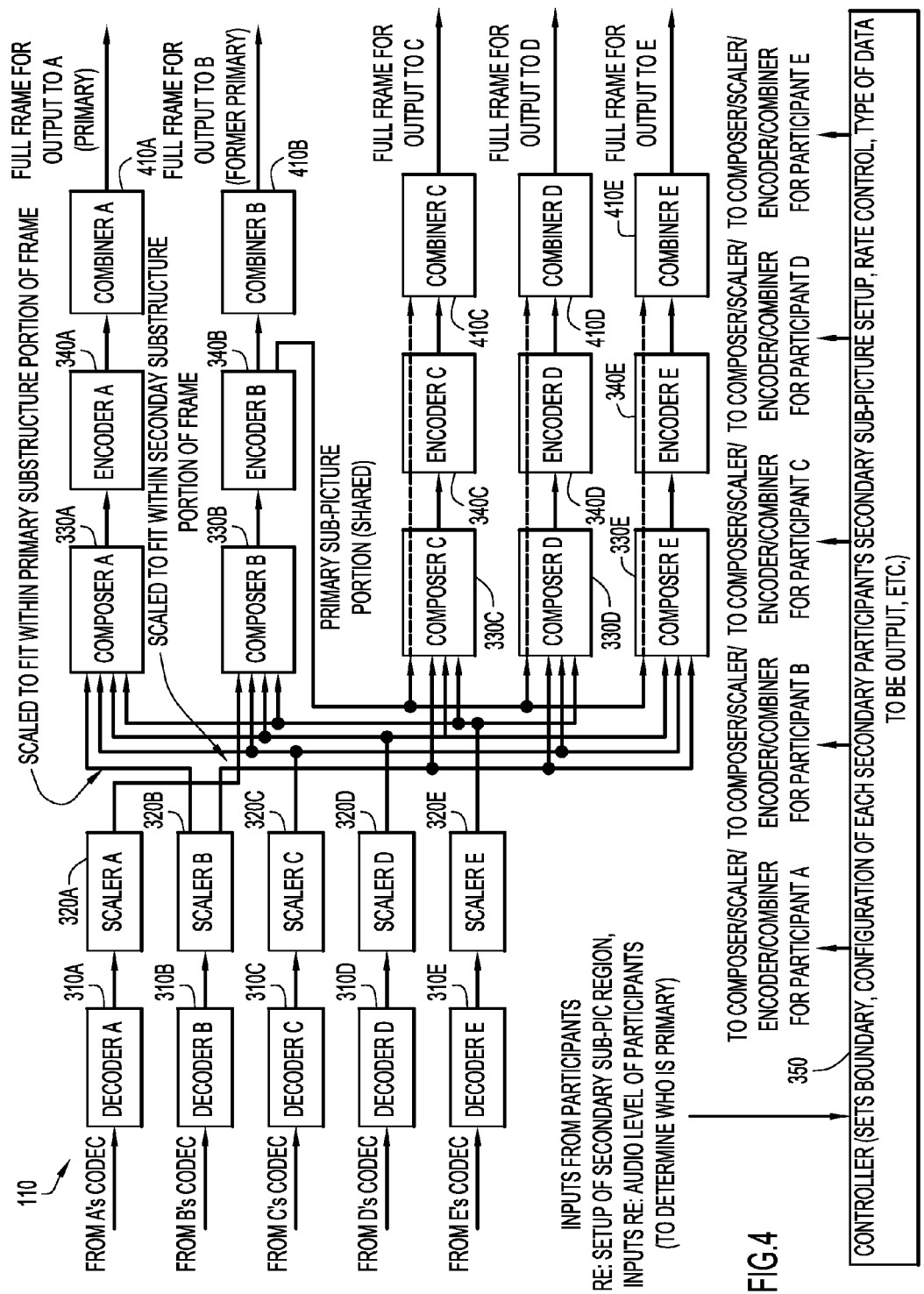
FIG. 4 is a detailed block diagram of a transcoder/MCU that includes a shared encoder and plural non-shared encoders for providing video data to video conference participants according to the techniques described herein.

FIG. 4 is an example block diagram of another possible implementation of a transcoder/MCU 110 that can also create shared video streams in accordance with techniques described herein. Encoded video output by codecs of participants A, B, C, D, E are respectively received and decoded by decoders 310A, 310B, 310C, 310D, 310E, which respectively output decoded (or "raw") video streams. Scalers 320A, 320B, 320C, 320D, 320E respectively scale the decoded video streams to fit within a particular portion of a frame. Scaler 320A may scale the decoded video from primary participant A to fit within a primary sub-picture portion of a frame, which may correspond to the top 80% of the frame. Scalers 320B, 320C, 320D, 320E respectively scale the decoded video from secondary participants B, C, D, E to fit within a particular area (or pane) assigned to a secondary participant in a secondary sub-picture portion of the frame. Each secondary participant pane may correspond to 2 to 5 percent of the frame, for example (with the remaining portion of the secondary sub-picture portion of the frame corresponding to "background" video obtained from a video stream of one of the participants). Scaler 320B also scales the decoded video from secondary participants B to fit within a primary sub-picture portion of a frame, to be shown in that portion of the frame to the primary participant A. In this case, secondary participant B is the former primary participant, who is shown to primary participant A in order to achieve self-view suppression for primary participant A. Note that signaling to source codecs can reduce the bandwidth of video contributed by secondary participants to something appropriate to the resolution at which the video is used, reducing overall participant contribution bandwidth.

In some implementations, scalers 320A, 320B, 320C, 320D, 320E are capable of expanding or reducing a video stream in one or both dimensions (e.g., in an X direction of a frame, or in a Y direction of a frame, or in both an X and a Y direction of a frame), so that the scaled video can fit within a space within a composed frame. If the video is expanded or reduced in both dimensions, it can be done by the same scale factor, in order to preserve the aspect ratio of the input video (e.g., a 16:9 aspect ratio of a video frame).

Composer 330B composes the scaled video of participant A output from scaler 310A to fit within a primary sub-picture portion of a frame 220 to be displayed to participant B, and composer 330B also composes the scaled video of participants C, D, E to fit within a secondary sub-picture of the frame 220, in which no video of participant B is included in the frame 220 in order to achieve self-view suppression for participant B. For example, composer 330B aligns the respective scaled video streams of participants A, C, D, E to achieve the format shown, e.g., by frame 220 in FIG. 2.

The composed video output by composer 330B is then provided to encoder 340B, which in this scenario functions as a shared encoder. Encoder 340B encodes the composed video output by composer 330B into one or more slices of video, to be sent out as one or more packets to participant B. Also, the primary sub-picture portion of the frame encoded by encoder 340B is separately provided to composers 330C, 330D, 330E. The primary sub-picture portion of the frame 220 encoded by encoder 340B corresponds to encoded video of primary participant A, and is shared encoded data to be used in generating video frames to be sent to participants C, D, E.

More specifically, composer 330C composes the encoded video of participant A as output from encoder 340B to fit within a primary sub-picture portion of a frame 230 to be displayed to participant C, and composer 330C also composes the scaled video of participants B, D, E to fit within a secondary sub-picture of the frame 230, in which no video of participant C is included in the frame 230 in order to achieve self-view suppression for participant C.

In a similar manner, composer 330D composes the encoded video of participant A as output from encoder 340B to fit within a primary sub-picture portion of a frame 240 to be displayed to participant D, and composer 330D also composes the scaled video of participants B, C, E to fit within a secondary sub-picture of the frame 240, in which no video of participant D is included in the frame 240 in order to achieve self-view suppression for participant D.

Also, composer 330E composes the encoded video of participant A as output from encoder B to fit within a primary sub-picture portion of a frame 250 to be displayed to participant E, and composer 330E also composes the scaled video of participants B, C, D to fit within a secondary sub-picture of the frame 250, in which no video of participant E is included in the frame 250 in order to achieve self-view suppression for participant E.

In some implementations, composers 330A, 330B, 330C, 330D, 330E do not perform any scale adjustment of the video (since that is done by scalers 320A, 320B, 320C, 320D, 320E), but instead copy each frame of its input stream (which may include chopping off some bits within a received frame) to fit into a defined space within a video frame that it is composing (that is, a frame having a primary sub-picture portion, a secondary sub-picture portion, and a boundary separating those two portions, in which the secondary sub-picture portion may include one or more regions for which secondary participant video is to be displayed).

Encoder 340C receives the composed video output by composer 330C, and only encodes the composed video of participants B, D, E that is to be provided within the secondary sub-picture portion of a frame to be shown to participant C, since encoder 340B has already encoded the video of participant A that is to be provided within the primary sub-picture portion of the frame 230 to be shown to participant C. Said in another way, the encoded video of participant A output by encoder 340B is passed through encoder 340C, since it was previously encoded by 'shared' encoder 340B.

Encoder 340D receives the composed video output by composer 330D, and only encodes the composed video of participants B, C, E that is to be provided within the secondary sub-picture portion of a frame 240 to be shown to participant D, since encoder 340B has already encoded the video of participant A that is to be provided within the primary sub-picture portion of the frame to be shown to participant B. Similar to the description above with respect to encoder 340C, the encoded video of participant A output by encoder 340B is passed through encoder 340D, since it was previously encoded by 'shared' encoder 340B.

Similarly, encoder 340E receives the composed video output by composer 330E, and only encodes the composed video of participants B, C, D that is to be provided within the secondary sub-picture portion of a frame 250 to be shown to participant E, since encoder 340B has already encoded the video of participant A that is to be provided within the primary sub-picture portion of the frame to be shown to participant B. Similar to the description above with respect to encoders 340C and 340D, the encoded video of participant A output by encoder 340B is passed through encoder 340E, since it was previously encoded by 'shared' encoder 340B.

Encoders 340C, 340D, 340E may also include a combining function in some implementations, in which they combine the encoded video of participant B (as encoded by encoder 340B) to be provided within a primary sub-picture portion of a frame, with the encoded video of a subset of the secondary participants to be provided within a secondary sub-picture portion of the frame. As a result, an encoded video stream of a full frame is obtained, which can then be packetized into one or more packets and sent to the respective secondary participants C, D, E as packets encoded using an RTP protocol, for example.

The encoding by encoder 340B of the video of participant A to fit within a primary sub-picture portion of a frame is performed in such a manner that no motion vectors within the slices of encoded data output by encoder 340B cross over the boundary of the frame that separates the primary sub-picture portion and the secondary sub-picture portion of the frame. This is because the video provided in the primary sub-picture portion of the frame is different from the video provided in the secondary sub-picture portion of the frame, and thus any motion vectors that cross this boundary may result in corrupted video data in the primary sub-picture portion of the frame.

In a similar manner, the encoding by encoders 340C, 340D, 340E, of the video of a subset of secondary participants to fit within a secondary sub-picture portion of a frame is performed in such a manner that no motion vectors within the slices of encoded data output by encoders 340C, 340D, 340E cross over the boundary of the frame that separates the primary sub-picture portion and the secondary sub-picture portion of the frame. Again, this is because the video provided in the secondary sub-picture portion of the frame is different from the video provided in the primary sub-picture portion of the frame, and thus any motion vectors that cross this boundary may result in corrupted video data in the secondary sub-picture portion of the frame.

Combiners 410C, 410D, 410E (which may be implemented in some configurations as a separate function of the encoders 340C, 340D, 340E, and in other configurations as a component separate from the encoders) respectively combine (or concatenate) the encoded video (one or more slices) of the primary sub-picture portion of a frame as encoded by the shared encoder 340B, and the encoded video (one or more slices) of the secondary sub-picture portion of the frame as encoded by respective non-shared encoders 340C, 340D, 340E, to form complete frames for output to secondary participants C, D, E. Combiner 410B combines (or concatenates) the encoded video (one or more slices) of the primary sub-picture portion of a frame as encoded by the shared encoder 340B, and the encoded video (one or more slices) of the secondary sub-picture portion of the frame as also encoded by the shared encoder 340B (but this portion is not shared with any other processing path), to form a complete frame for output to former primary participant B. Combiner 410A combines (or concatenates) the encoded video (one or more slices) of a primary sub-picture portion of a frame of the former primary participant B, as encoded by encoder 340A, and the encoded video (one or more slices) of a secondary sub-picture portion of the frame as also encoded by encoder 340A, to form a complete frame for output to primary participant A. As mentioned above, the combining performed by the combiners 410A, 410B, 410C, 410D, 410E can be included as a function performed by the respective encoders 340A, 340B, 340C, 340D, 340E in an alternative implementation, in which case no separate combiners would be included in such a transcoder/MCU. The combined encoded video streams are output via one or more output ports to the respective participants.

Also shown in FIG. 4 is a controller 350, which controls the operation of scalers 320A, 320B, 320C, 320D, 320E, composers 330A, 330B, 330C, 330D, 330E, and encoders 340A, 340B, 340C, 340D, 340E. For example, controller 350 performs rate control to operate a video conference within a designated bit rate range. Controller 350 may also designate which of the participants of the video conference is the primary participant, and sets the video for that participant as the primary participant video stream to then be encoded by a shared encoder. That is, in FIG. 4, participant A is the primary participant, and participant B is the former primary participant, and so encoder 340B for former primary participant B is set as a shared encoder to provide encoded video of primary participant A to be shown in a primary sub-picture portion of a frame to be shown to each of the secondary participants B, C, D. If, however, the primary participant changes to participant C, then encoder 340A, which becomes the encoder of the former primary participant, is set by controller 350 as the shared encoder to encode video of the new primary participant C (as output by decoder 310C and as scaled by scaler 320C) for inclusion in a primary sub-picture portion of a frame to be shown to secondary participants A, B, D, E. It is noted that the functions of controller 350 may be usually performed by the conferencing application, which has overall responsibility for the creation, configuration and connection of any of the processing units appearing in such diagrams The setting of the primary participant can be determined by the controller 350, for example, based on the participant with the maximum audio output in the most recent time period, or by token passing from the current primary participant to another primary participant.

Figure 5:
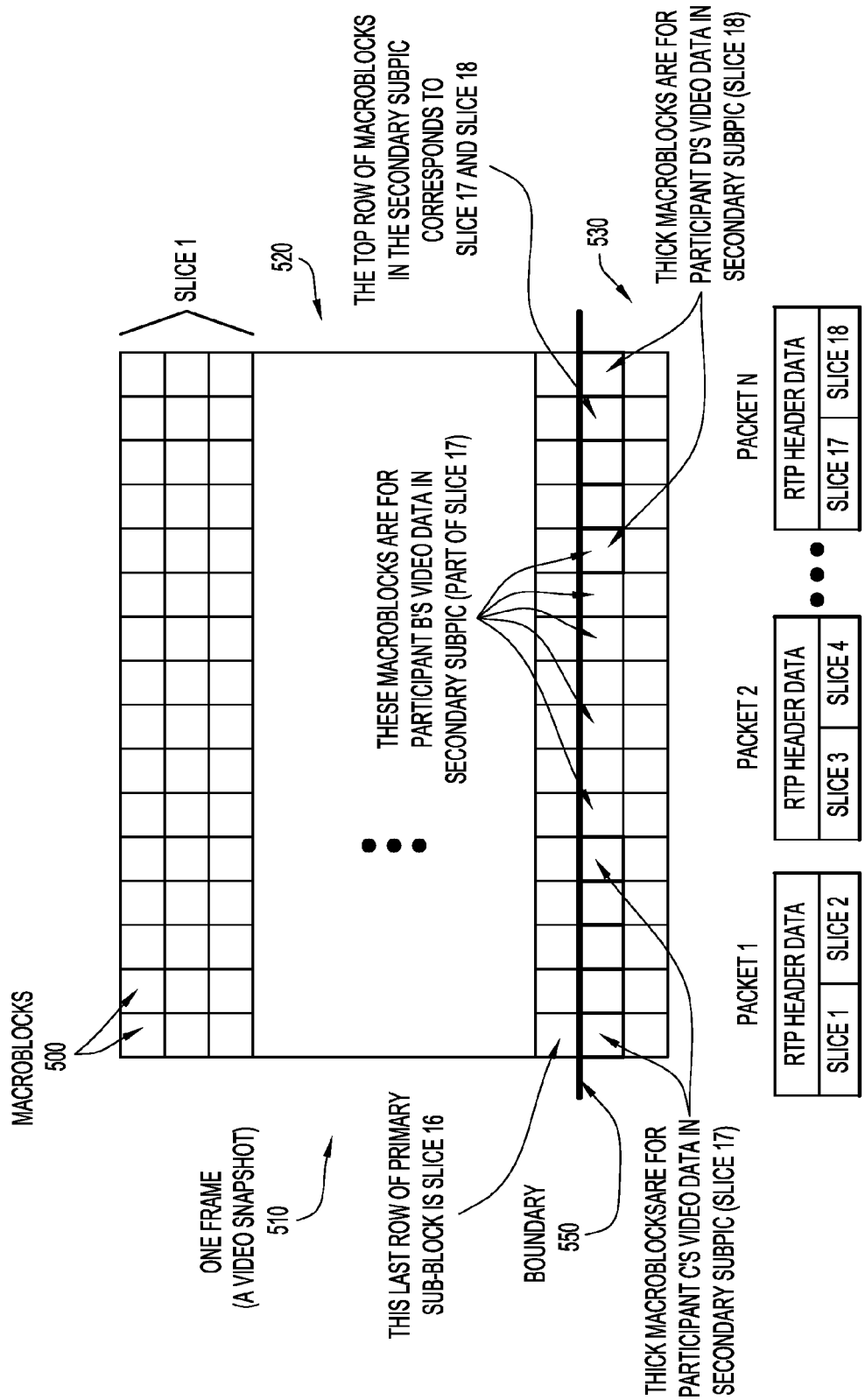
FIG. 5 illustrates a split frame of video data that may be created by a transcoder/MCU that includes a shared encoder and plural non-shared encoders according to the techniques described herein.

FIG. 5 is a diagram showing a technique in which a frame 500 of video data is created by a transcoder/MCU (such as the one shown in FIG. 4) based on output from a shared encoder (that provides encoded data in a primary sub-picture region) and a non-shared encoder (that provides encoded data in a secondary sub-picture region for a secondary participant). Frame 500 is divided up into H.264 macroblocks 510, in which each macroblock corresponds to a fixed 16×16 pixel region (H.265 uses similar block structures called "coding units" which may be of a defined size of (2\*\*N)\*(2\*\*N) pixels). Frame 500 is divided into a primary sub-picture portion (or region) 520 and a secondary sub-picture portion (or region) 530, which are separated from each other by a boundary 550. Boundary 550 is shown in FIG. 5 as a horizontal boundary; however, other types of boundaries (e.g., vertical, or a PiP) may be employed.

Boundary 550 may be set based on the number of secondary participants to be shown in the secondary sub-picture portion of frame 500 in one possible implementation, or it may be a preset boundary that does not change its location within the frame 500 in another possible implementation. For example, if 1 to 3 secondary participants are to be shown in the secondary sub-picture portion 530 of frame 500, then the encoded pane for each secondary participant would be placed within the lower 20% portion of frame 500 (see frames 210, 220, 230, 240, 250 in FIG. 2, for example). If 4 to 6 secondary participants are to be shown in the secondary sub-picture portion 530 of frame 500, then boundary 550 may be moved downwards to make the secondary sub-picture portion 530 of frame 500 take up 17% of frame 550 (and thus the primary sub-picture portion 520 of frame 500 takes up 83% of frame 500). If 7 to 9 secondary participants are to be shown in the secondary sub-picture portion 530 of frame 500, then boundary 550 may be moved further downwards to make the secondary sub-picture portion 530 of frame 500 take up 11% of frame 550 (and thus the primary sub-picture portion 520 of frame 500 takes up 89% of frame 500). This adjustment can be made by the controller 350 to show the display of the secondary participants in a "balanced" manner within frame 500.

Frame 500 shown in FIG. 5 corresponds to video data to be provided to a secondary participant, such as participant E in FIG. 2, and includes video data of the primary participant (e.g., the current active speaker, participant A) in the primary sub-picture portion 520 and video data of secondary participants other than the secondary participant (e.g., video of secondary participants B, C, D) to be provided in the secondary sub-picture portion 530 within frame 500. The encoded data within the primary sub-picture portion 520 of frame 500 corresponding to slice 16, which is adjacent to the boundary 550 (i.e., right above boundary 550), is encoded (by the shared encoder) such that no motion vectors of slice 16 cross into an area beneath boundary 550. Also, the encoded data within the secondary sub-picture portion 530 of frame 500 corresponding to slice 17 and slice 18, which is also adjacent to boundary 550 (i.e., right below boundary 550), is encoded (by the respective non-shared encoder) such that no motion vectors of slice 17 and slice 18 cross into an area above the boundary 550.

FIG. 5 also shows packets of data (Packet 1, Packet 2, . . . , Packet N) sent to participant E, in which each packet includes two slices of data aggregated into a payload portion of the packet. Those packets are received by a decoder (e.g., codec) of participant E, and are decoded to provide frames of video to be displayed to participant E during a video conference attended by participant E. In alternative configurations, and based on the size of the packets used to transport the encoded data to the participants, each of the packets may include one slice, or a portion of one slice (in which one slice is fragmented into in two or more packets output by the transcoder/MCU 110).

As described above, slice data that form the video stream for each participant are treated as if they had originated in a single encoding process, when in fact they had originated from multiple encoding processes and combined into a single encoding stream, in which that single encoding stream is adapted to an RTP layer uniquely for each participant, and output onto a network within payload portions of packets. That is, for each participant, slices from the primary and secondary sub-picture areas of a frame are concatenated into a slice stream and packetized with per-participant RTP and encryption properties.

Figure 6:
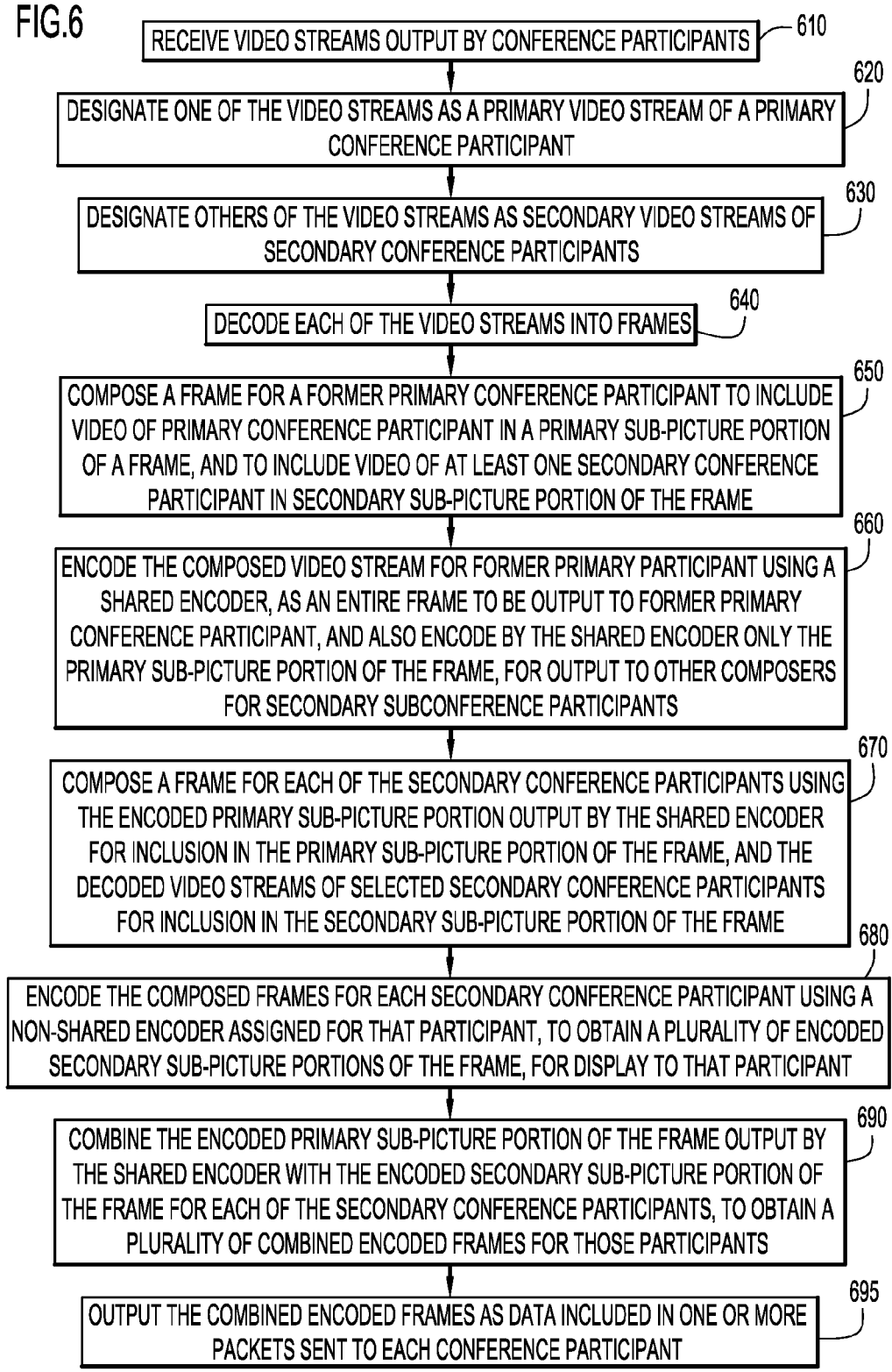
FIG. 6 is a flow diagram of a split-frame encoding scheme used in a video conference according to the techniques described herein.

FIG. 6 is a flow diagram describing the creation of video frames for conference participants using a 'shared encoder' transcoder/MCU 110 according to the techniques described herein, and which may be implemented with Video Conference Shared Encoding Logic 120 as shown in FIG. 1). In 610, video streams output by conference participants are received by the MCU. In 620, one of the received video streams is designated (by controller 350 of FIG. 4, for example) as a primary video stream of a primary conference participant, and in 630, others of the received video streams (e.g., the remaining video streams) are designated (by controller 350 of FIG. 4, for example) as plural secondary video streams of plural secondary conference participants, respectively. These designations can be remade during the course of the conference, especially when based on dynamic characteristics of the participants, such as which participants are, or have been, the most active speakers in the conference.

In 640, each of the video streams is decoded by a decoder into frames. In 650, a composer assigned to one of the secondary participants, such as the former primary participant, composes a frame for that participant. The composed frame includes video of the primary participant in a primary sub-picture portion of the composed frame, and video of at least one other secondary participant (but not video of the former primary participant) in a secondary sub-picture portion of the composed frame.

In 660, a shared encoder (which in this case corresponds to an encoder assigned to the former primary participant) encodes the composed video stream output by the composer, as an entire frame of video to be output to the former primary participant, in which a portion of the frame corresponding to only the primary sub-picture portion of the frame is output to a plurality of other composers. The entire frame of video encoded by the shared encoder is then packetized into one or more packets, and output to the former primary participant for display by the former primary participant attending a video conference.

In 670, the other composers (e.g., composers 330C, 330D, 330E in FIG. 3) compose a respective frame for plural secondary participants by incorporating the encoded primary sub-picture portion of the frame output by the shared encoder (e.g., encoder 340B in FIG. 3) into a primary sub-picture portion of the respective frame, and by incorporating video of at least one other secondary participant (but not video of the secondary participant for which the respective frame is being composed for) in a secondary sub-picture portion of the frame.

In 680, plural encoders (referred to herein as "non-shared encoders") assigned to produce video bitstreams for each of the plural secondary participants encode the secondary sub-picture portion of the respective composed frames provided to those encoders (in which the plural encoders do not act on the already-encoded primary sub-picture portion of the respective composed frames). In 690, the encoded primary sub-picture portion of the respective frames (as encoded by a respective non-shared encoder) and the encoded secondary sub-picture portion of the respective frames (as encoded by the shared encoder) are combined into a full frame for output to the respective secondary participants. In 695, the combined encoded video is packetized into one or more packets, for output to the respective secondary participants, for display by those respective secondary participants attending a video conference.

Figure 7:
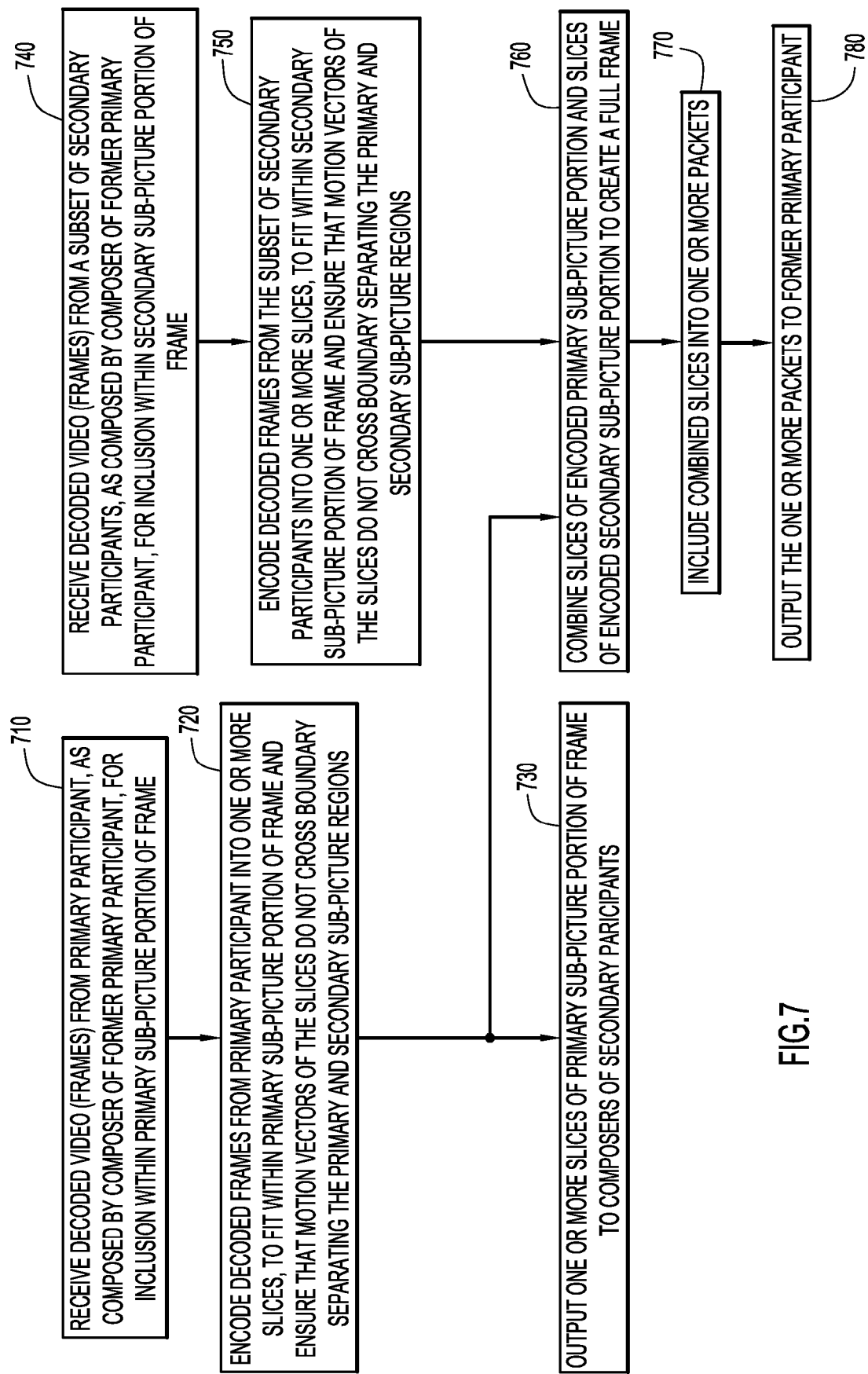
FIG. 7 is a flow diagram of a process for performing shared encoding for creating a primary sub-picture region that is sent to plural participants according to the techniques described herein.

FIG. 7 is a flow diagram illustrating the processing performed by a shared encoder, according to the techniques described herein. In 710, decoded video (e.g., frames of video) from a secondary participant, such as a former primary participant, is received by the shared encoder, in which the decoded video has been composed by a composer assigned to that secondary participant. It is noted that the primary sub-picture content may be formed from any one of multiple sources, or comprise one of multiple graphical constructs. Those skilled in the art will appreciate that the content is raw video content of some kind to be sent to multiple secondary participants. In 720, the decoded frames are encoded to fit within a primary sub-picture portion of a frame for the primary participant, in which the encoding performed by the shared encoder is performed such that one or more slices defined by the shared encoder, and the motion vectors of the one or more slices computed by the shared encoder, do not cross a boundary separating the primary sub-picture portion and a secondary sub-picture portion of the frame for the former primary participant.

In 730, the computed one or more slices that correspond to the primary sub-picture portion of the frame for the former primary participant are output by the shared encoder to composers of other secondary participants (ones other than the former primary participant), for use by those composers in composing frames of video to be displayed by those other secondary participants (after having secondary sub-picture portions of their respective frames encoded by non-shared encoders and then having the primary and secondary sub-picture portions combined by combiners into full frames to be output to the other secondary participants as one or more packets). It should be noted that the encoded slices can also be supplied to the appropriate combiner without passing through a non-shared encoder.

In 740, decoded video (e.g., frames of video) from a subset of secondary participants that do not include the former primary participant, is received by the shared encoder, in which the decoded video has been composed by a composer assigned to the former primary participant for inclusion in a secondary sub-picture portion of a frame to be displayed at the former primary participant. In 750, the decoded frames are encoded to fit within a secondary sub-picture portion of a frame for the former primary participant, in which the encoding performed by the shared encoder is performed such that motion vectors of one or more slices computed by the shared encoder do not cross a boundary separating the secondary sub-picture portion and the primary sub-picture portion of the frame for the former primary participant.

In 760, the result of 720 and 750, i.e., one or more slices representative of video in the primary sub-picture portion and one or more slices representative of video in a secondary sub-picture portion of a frame for the former primary participant, are combined to create a full frame for the former primary participant.

In 770, the combined slices are packetized into one or more packets, and in 780 the one or more packets are output to the former primary participant, e.g., via the Internet, or Wide Area Network, or Local Area Network, for display by the former primary participant attending a video conference.

Figure 8:
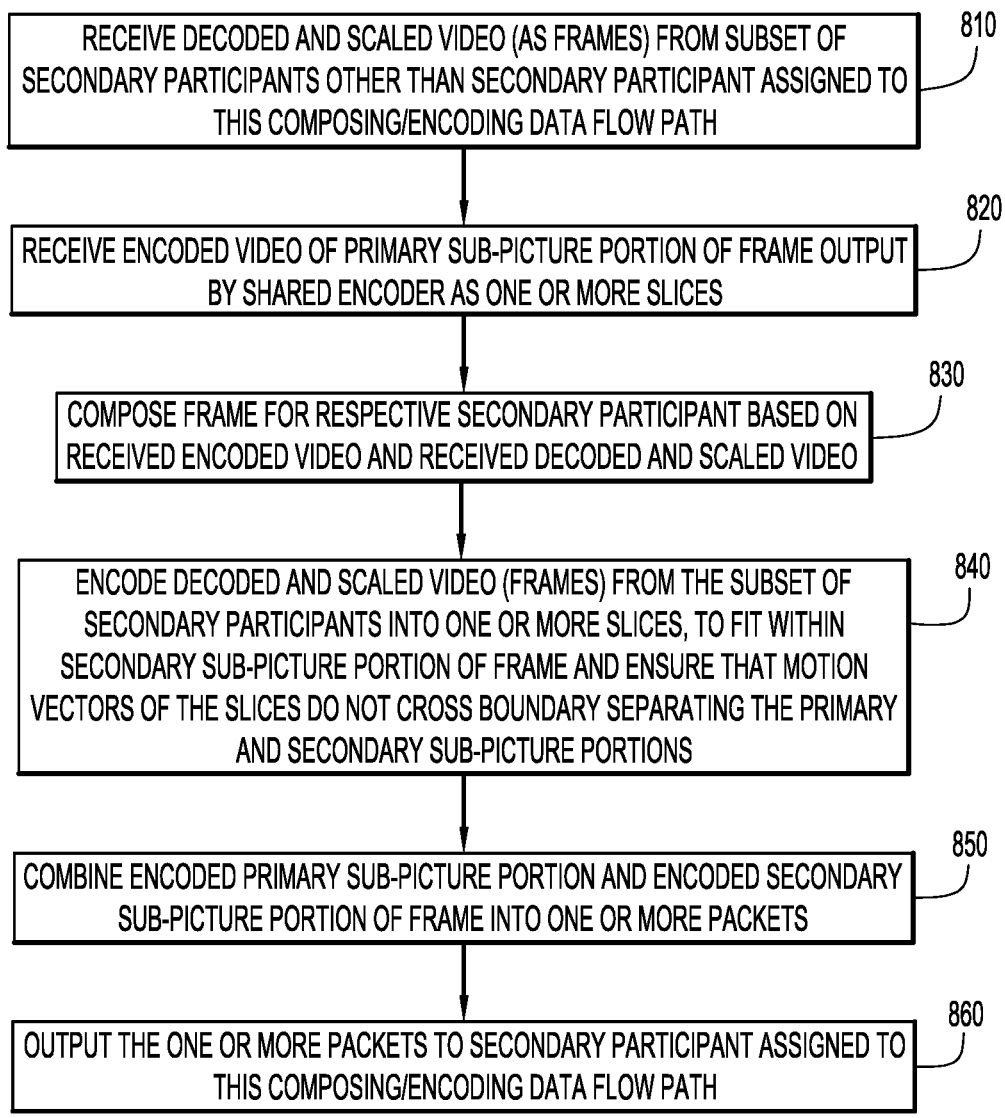
FIG. 8 is a flow diagram of a process for performing non-shared encoding for creating a secondary sub-picture region to be sent to one participant according to the techniques described herein.

FIG. 8 is a flow diagram illustrating the processing performed by a composer/non-shared encoder processing path (e.g., the path with composer 330C and encoder 340C, or the path with composer 330D and encoder 340D, or the path with composer 330E and encoder 340E in FIG. 3), according to the techniques described herein. In 810, the non-shared encoder (e.g., encoder 340C in FIG. 3) receives decoded and scaled video (as frames of video) from one or more secondary participants other than the secondary participant that is assigned for that non-shared encoder. In 820, the non-shared composer also receives encoded video of a primary sub-picture portion of a frame output by the shared encoder (see 730 in FIG. 7), as one or more slices that represent the encoded video in the primary sub-picture portion of the frame.

In 830, a frame is composed for the respective secondary participant assigned to the composer/non-shared encoder processing path based on the received encoded video and the received decoded and scaled video. In 840, the decoded and scaled video of the composed frame that represents the secondary sub-picture portion of the frame is encoded by the non-shared encoder into one or more slices representative of the encoded video, in which the encoding is performed by the non-shared encoder such that motion vectors of the one or more slices within the secondary sub-picture portion of the frame do not cross the boundary separating the secondary sub-picture portion and the primary sub-picture portion of the frame.

In 850, the encoded primary sub-picture portion of the frame (corresponding to one or more slices that were output by the shared encoder) is combined with the encoded secondary sub-picture portion of the frame (created by the non-shared encoder), into a full frame, which is then packetized into one or more packets. In 860, the one or more packets are output onto a network (e.g., the Internet, a LAN, or a WAN) to the secondary participant assigned to this composing/encoding/combining data flow path.

Figure 9:
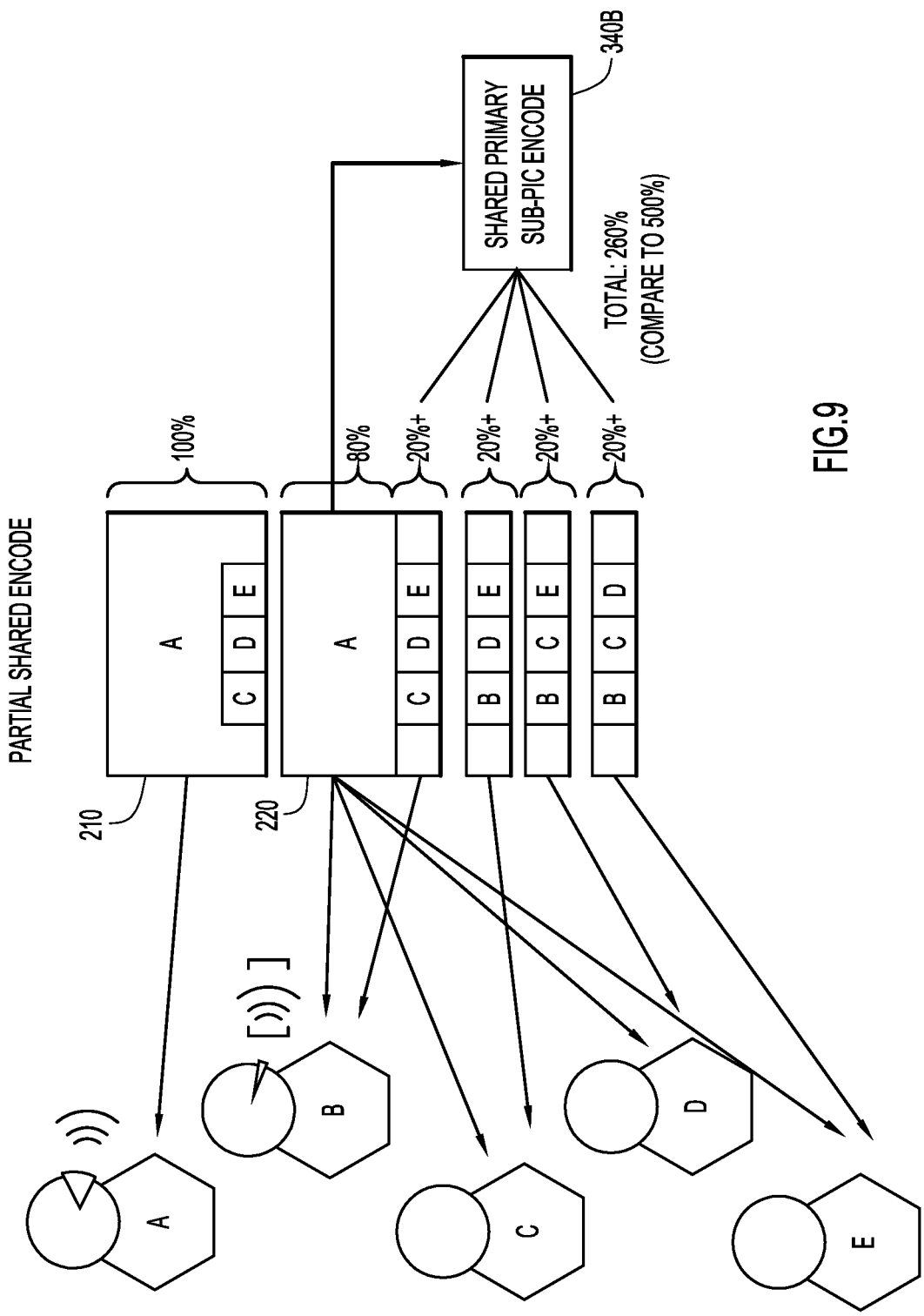
FIG. 9 illustrates the amount of encoding that can be saved by utilizing a transcoder/MCU that includes a shared encoder and plural non-shared encoders according to the techniques described herein.

FIG. 9 is a block diagram that shows the potential savings achieved by implementing the transcoder/MCU 110 that leverages the use of partial shared encoding in accordance with techniques described herein. The amount of processing is based on a 80%/20% split between the primary sub-picture size and the secondary sub-picture size in the frames sent to the participants. Primary participant A receives video of former primary participant B in the primary sub-picture portion of its frame 210, whereby no other participant receives that video data in the respective primary sub-picture portion of its frame. Also, primary participant A receives video data in the secondary sub-picture portion of its frame 210 that corresponds to video of secondary participants C, D, E, which is uniquely provided for primary participant A. As such, 100% encoding resources are employed for producing frame 210.

Each of secondary participants B, C, D, E receives video of the primary participant A in the primary sub-picture portions of their respective frames, in which this video is provided by a shared encoder. This video takes up 80% of the respective frames sent to secondary participants B, C, D, E (the size of the primary sub-picture portion in those frames), and is only encoded once, but distributed to multiple participants, thereby saving on encoding resources at the transcoder/MCU. Each of secondary participants B, C, D, E receives only its unique video in the secondary sub-picture portion of their respective, so that any self-view does not occur (that is, so that, e.g., secondary participant C does not see himself/herself in the secondary sub-picture portion of the frame sent to secondary participant C). As such, with four secondary participants each receiving their own uniquely encoded secondary sub-picture data (that is concatenated with the shared video data that is used to create the primary sub-picture data), only an additional 20%*4=80% encoding resources are consumed to service the secondary participants.

As such, the total amount of encoding resources expended becomes 100% (the amount of resources for providing a frame 210 for primary participant A)+80% (the amount of resources for providing a primary picture sub-frame 220 for former primary participant B)+{20%*4} (the amount of resources for providing secondary sub-frames for secondary participants B, C, D, E)=260%. This can be compared to a conventional continuous presence system in which a transcoder/MCU has to create a unique video stream for each conference participant, thereby costing 100%*5=500% in encoding resources for the same five-person video conference. As a result, a savings of 500%−260%=240% is achieved using techniques according to the present invention. The above calculations showing the savings that may be obtained by using a transcoder/MCU 110 in accordance with the techniques described herein are based on the premise that the encoding resources expended for encoding 20% of a frame are 20% of the encoding resources expended for encoding 100% of a frame. Similar or greater gains in processing economy are achieved when the number of secondary participants is increased, as long as the secondary sub-picture does not increase as a proportion of the total encoded frame area. In fact, it is a reasonable choice to reduce the size of the secondary sub-picture as a consequence of showing each secondary participant at a reduced scale (relative to a secondary sub-picture that showed fewer participants).

The scheme of shared encodes can also be applied to an equal-view layout, which differs from the primary/secondary layout in that all participants are composited as of equal size, rather than giving a significant speaker a dominant proportion of the composed picture area. The equal-view layout involves composing participants in an L×L grid, with one participant per cell, and each cell of equal proportions. This composition can be treated as L full-width sub-pictures that are 1/L height of the full picture, and when some of these sub-pictures encoded for transmission to multiple conference participants, significant economy can be achieved. One example would be L=3, and a 3×3 grid which allows 10 participants to be visible in the conference A-J (any one of which can see 9 others, but not themselves). The first four participants (A-D) can be shown in four versions of the top sub-picture as {B,C,D} to A, {A,C,D} to B, {A,B,D} to C and {A,B,C} to D. To each of these participants, the remainder of the picture is composed of shared encoded sub-pictures {E,F,G} and {H,I,J}. For participants E-G, the top sub-picture consists of a shared encoded sub-picture showing {A,B,C} (as sent to D) combined with individually composed sub-pictures showing {D,F,G} to E, {D,E,G} to F and {D,E,F} to G. The remainder of the layout is made up of a shared encode sub-picture showing {H,I,J}. For participants H-J, the first and second sub-pictures show shared encode strips {A,B,C} (as sent to D) and {D,E,F} (as sent to G), and the final sub-picture shows {G,I,J} to H, {G,H,J} to I and {G,H,I} to J. We have satisfied 10 participants with only 12 sub-pictures each of ⅓ picture area, with the sub-picture encodes equivalent to 1⅔ full picture encodes. Four of 12 sub-pictures are encoded for transmission to multiple recipients. The general formula is that using shared-encoded sub-pictures an L×L layout can serve L×L+1 visible participants from L+1 units of encoding resource (and any non-visible participants can see one of the streams sent to visible participants), rather than L×L+1 units of encoding resource for the individually encoded case.

Figure 10:
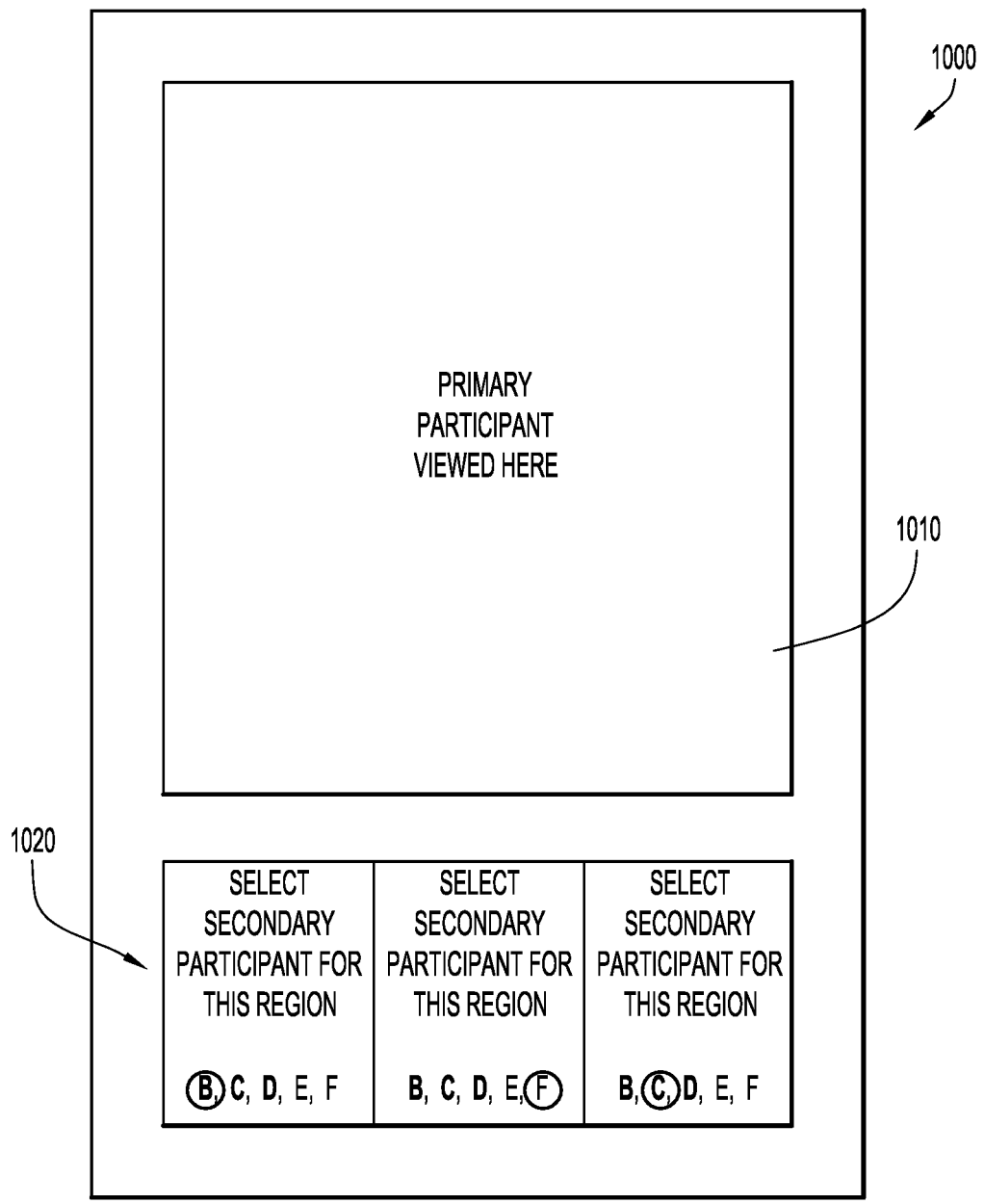
FIG. 10 illustrates a graphical user interface that may be provided to a user for selecting participants to be provided on a secondary sub-picture region of video frames to be shown to the user according to the techniques described herein.

In one embodiment, conference behavior is rule-based, and these rules define the set of participants that is shown to any other participant. FIG. 2 can be interpreted as showing a sub-set of a conference in which only five participants are given visual prominence, these five being defined, for example, by their recent (e.g. vocal) activity in the conference. But because the secondary sub-picture is composed and encoded on a per-participant basis, the content of this region can in fact be defined other than under a strict set of rules, and can include some element of participant choice. The relationship to the shared encoded sub-picture is maintained if the overall dimensions of the secondary sub-picture is common amongst participants. FIG. 10 is a diagram illustrating a graphical user interface (GUI) 1000 that may be provided to a participant, to allow that participant to select the view within his/her secondary sub-picture portion 1020 of a frame to be shown to that participant. For example, the GUI 1000 may be provided to participant E in FIG. 2. The primary sub-picture portion 1010 of the frame includes video of the primary participant (e.g., participant A), and cannot be modified by the participant. The GUI 1000 does allow the participant to select which participants to be shown in the secondary sub-picture portion 1020 of a frame to be shown to that participant. In the example shown in FIG. 10, the secondary sub-picture portion 1020 includes regions for displaying three other secondary participants, and in this case, the participant selected to see views of participant B, F, and C in that order (the GUI 1000 does not allow that participant, participant E, to select himself/herself, to maintain self-view suppression) for display in the secondary sub-picture portion 1020 of the frame.

Figure 11:
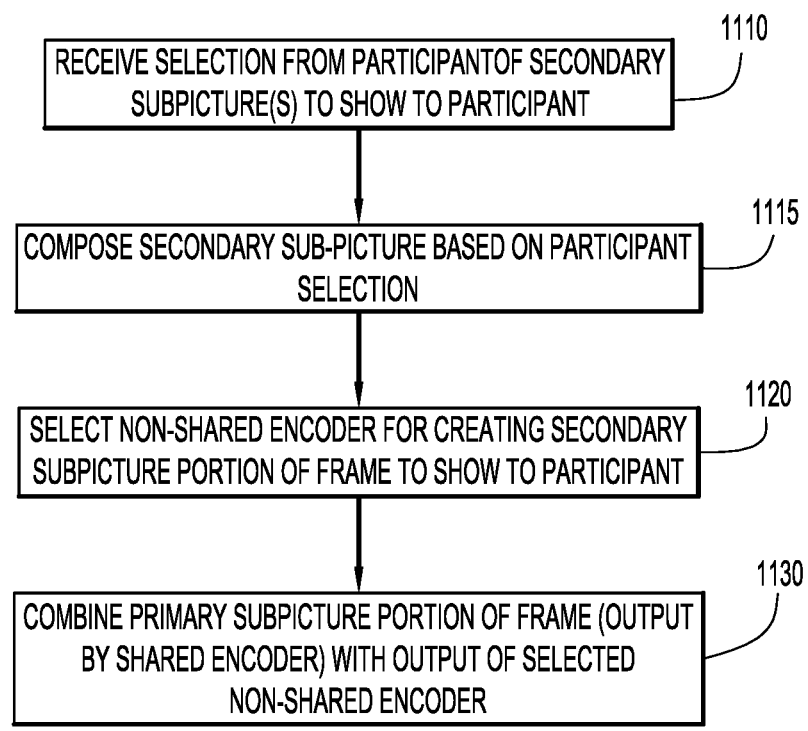
FIG. 11 is a flow diagram of a process for receiving a user-selection of video to be displayed to that user and for providing video to the user during a video conference according to the techniques described herein.

FIG. 11 is a flow diagram illustrating the creation of a frame for a participant based on selections made by the participant the GUI 1000 of FIG. 10. In 1110, selections made by the participant for which secondary participants are to be displayed in the secondary sub-picture portion 1020 of the frame to be provided to that participant are received by the transcoder/MCU 110 (e.g., controller 350). In 1115, the secondary sub-picture is composed based on participant selection. In 1120, a non-shared encoder (e.g., encoder 340E in FIG. 3) is selected for creating the secondary sub-picture portion 1020 of the frame to be shown to that participant (e.g., participant E). In 1130, the primary sub-picture portion of the frame, as encoded by a shared encoder, and the secondary sub-picture portion 1020 of the frame, as encoded by the non-shared encoder assigned to this participant, are combined, packetized, and output to the participant, for display.

Figure 12:
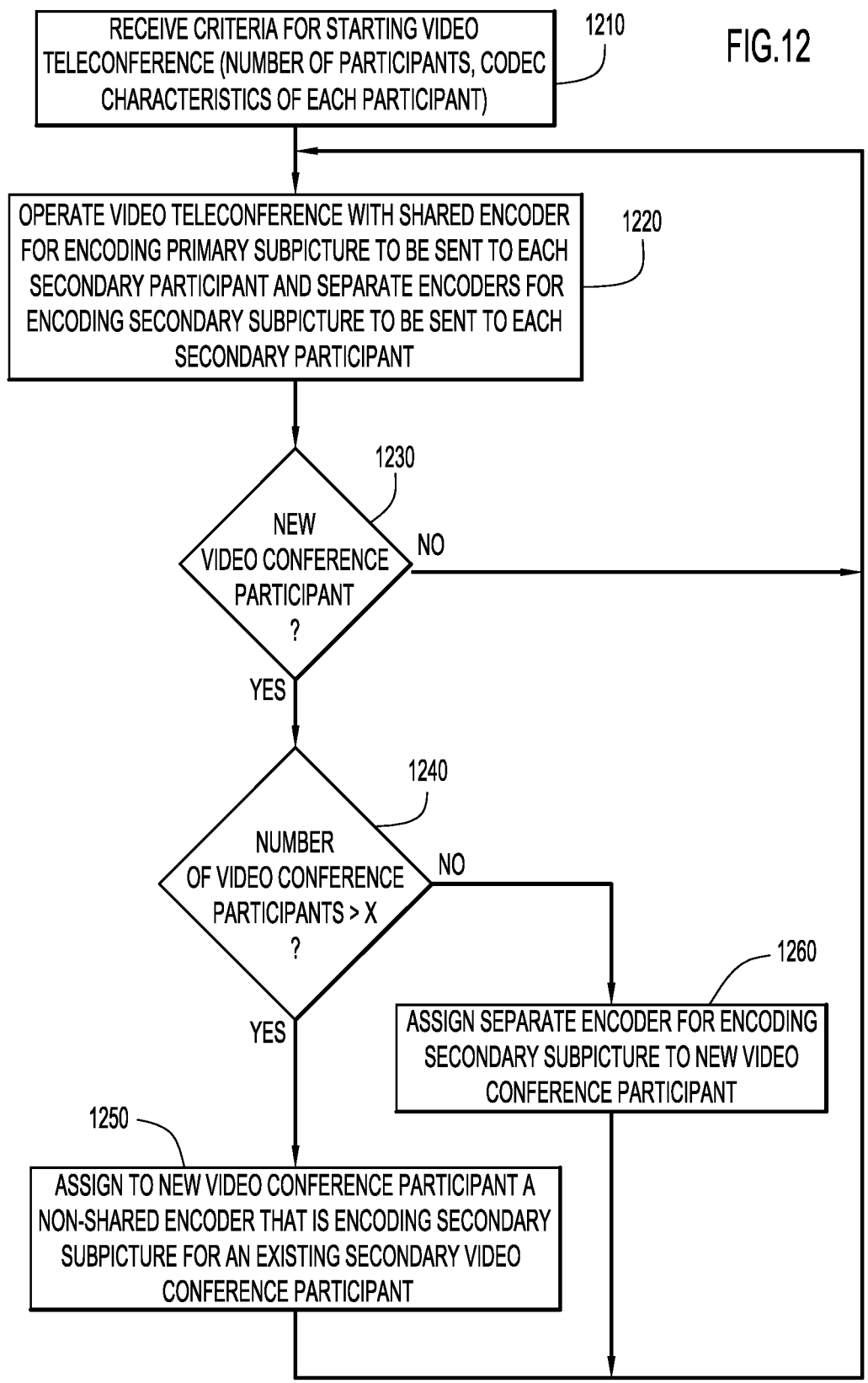
FIG. 12 is a flow diagram of a process for reassigning encoders of a transcoder/MCU to participants of a video conference based on a change in conference participants according to the techniques described herein.

As described previously, there is a natural limit to the number of secondary conference participants that can reasonably be shown in a minority-area secondary sub-picture; to show more participants could only be done by using a scale that would make the view of each participant ineffective. Yet the conference can accommodate more participants, to the extent that they receive a view of the primary and secondary participants without themselves being visible in the conference. This class of off-screen "tertiary" participants can themselves be escalated to primary or secondary status if they take up a more active role in the conference (activity typically defined in the parallel audio streams provided by that participant), but while classed as nonactive, they do not have unique requirements for the video that is presented to them (if not visible, they do not require self-view suppression). FIG. 12 is flow diagram illustrating the allocation of encoders in the transcoder/MCU 110 due to a new video teleconference participant entering an existing video conference, according to a technique to be described herein. In 1210, criteria for starting a video teleconference is received. This criteria may include the number of participants, rate control parameters (e.g., designated bit rate range for the video conference), and characteristics of codecs provided for each of the participants (e.g., high resolution, low resolution). Rate control provides a mechanism to produce streams of video (and/or audio) within a bit rate budget, and it takes into account the encoding of the various encoders utilized to create a split-frame multi-stream encode according to the techniques described herein. While the shared encoder will likely take up a dominant proportion of the bit rate budget, the non-shared encoders' bit rate usage also has to be taken into account for determining whether a video conference operates within an acceptable bit rate range. Rate control as performed by the controller 350 (see FIG. 3 and FIG. 4) makes decisions based on bits expended to create previous frames of video, and instructs the encoders of the transcoder/MCU 110 to operate at a particular quantization parameter for succeeding frames, to ensure that the video conference operates within an assigned bit rate budget for that video conference.

In 1220, the video teleconference is operated with a transcoder/MCU 110 having a shared encoder/non-shared encoder configuration, such as shown in FIG. 3 and FIG. 4, in which the shared encoder encodes a primary sub-picture portion of a frame (corresponding to video of a primary participant) to be included in frames to be shown to the secondary participants, and in which plurality non-shared encoders respectively encode secondary sub-picture portions of the frames to be shown to the secondary participants.

In 1230, a determination is made as to whether a new participant has entered (or seeks to enter) the video teleconference. If No, then the process returns to 1220 to continue the video teleconference in the same manner as before. If Yes, then in 1240 a determination is made as to whether the number of participants is greater than X (X is an integer value greater than two). If No, then in 1260 a separate encoder is assigned to the new participant, for encoding a secondary sub-picture portion of a frame for the new participant. If Yes, then the new participant is assigned a non-shared encoder that is currently encoding a secondary sub-picture portion of a frame for a current secondary participant. For example, if there are four (4) participants in a video teleconference using the transcoder/MCU 110 of FIG. 4, then if a fifth participant enters the video teleconference, an available decoding/composing/encoding processing path can be assigned to that fifth participant (e.g., participant E). If, however, there are five or more participants already in the video teleconference, when a new participant enters, that new participant is assigned a composing/encoding processing path already assigned to an existing participant (e.g., a new participant F is assigned the composing/encoding processing path already assigned to participant C), in which self-view suppression is maintained for both of those participants assigned to that same composing/encoding processing path.

In a similar manner, when a participant exits the video teleconference, a composing/encoding processing path is freed up for a new participant or an existing participant who is currently sharing a composing/encoding processing path with another participant.

In a multi-encoder conference, such as one utilizing the transcoder/MCU 110 in accordance with one or more techniques described above, each encoder operates a rate control function. Video frames at a given resolution are commonly set to a specific target bitrate, but where the encoded scene differs between streams, due to different views of secondary participants, for example, the rate control functions of those encoders act independently to keep each stream to its target bitrate. A rate control function operates to adjust a quantization parameter to achieve a target outgoing bitrate of the encoded stream. The quantization parameter may be applied uniformly to an entire frame, or adjusted at the sub-frame level. When the quantization parameter is applied at the frame level, the primary input to the rate control algorithm which adjusts its value is the consumption of bits by past encoded frames. If the recent consumption is tending to exceed the long-term target bitrate, then the quantization parameter may be adjusted upwards to produced fewer bits per encoded frame, or if the encoded bitrate falls below the target, the quantization parameter value may be lowered, to spend more bits and so achieve higher video quality. The feedback of bits expended as a result of past quantization parameter choices is a vital input to the rate control function.

The shared state of the video encoding as provided by the transcoder/MCU 110 extends to the rate control function provided by the controller 350 of the transcoder/MCU 110. In more detail, the input to rate control to meet a target transmitted bitrate may be determined from the combination of the bits expended on the common primary sub-picture and the bits expended on the most expensive of the secondary sub-pictures, to ensure that, when combined with the common encoded data output by the shared encoder, even the most complex secondary participant stream is bounded by the target bitrate. The other sub-pictures may be coded with the same quantization parameter as is set for the most complex sub-picture in some implementations, or they may be allowed a degree of freedom in setting an alternate parameter value in other implementations.

Figure 13:
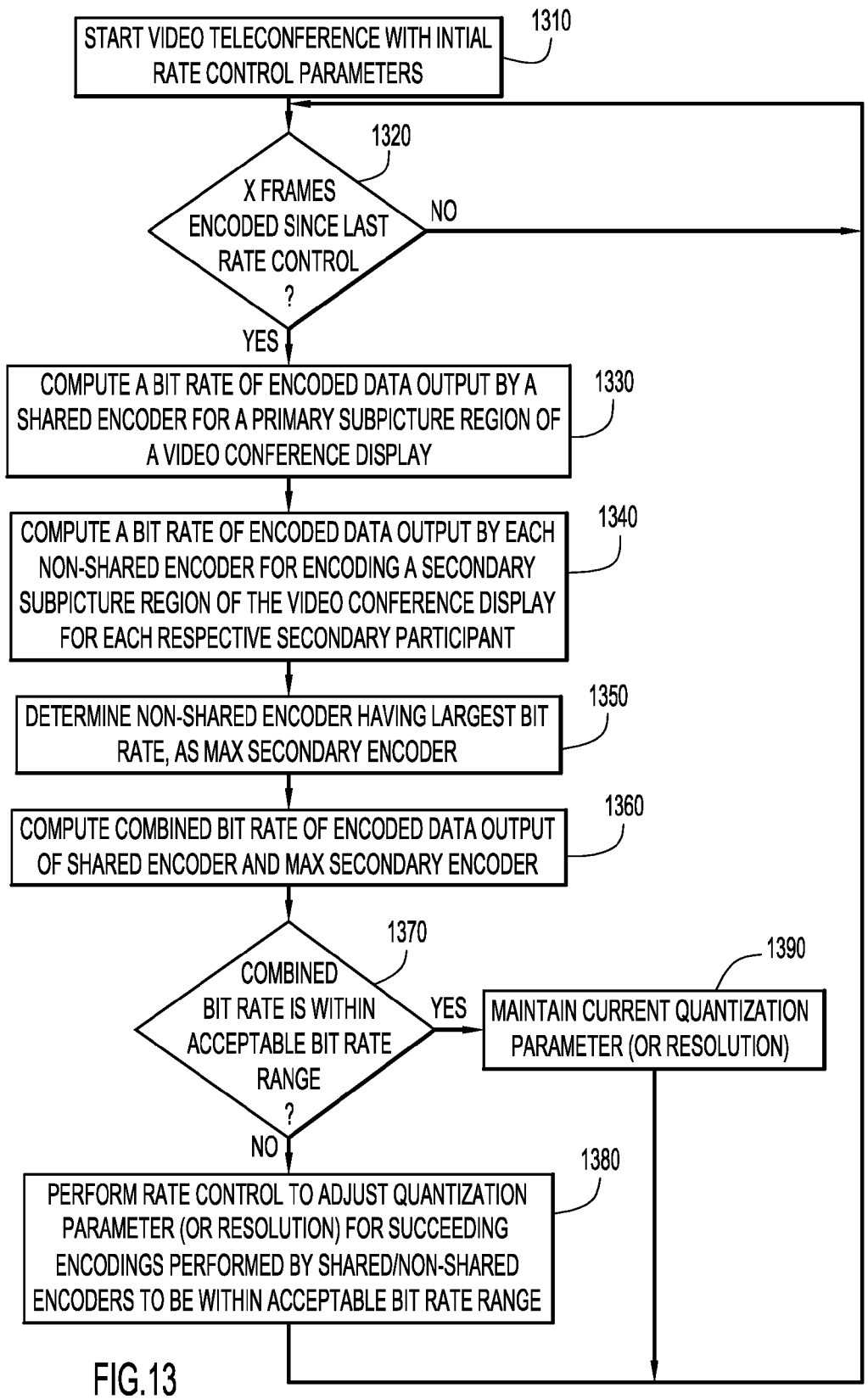
FIG. 13 is a flow diagram of a process for performing flow control for a transcoder/MCU that includes a shared encoder and plural non-shared encoders according to the techniques described herein.

FIG. 13 is flow diagram illustrating how rate control may be performed for the transcoder/MCU 110, according to a technique described herein. In 1310, a video teleconference is started with initial rate control parameters (e.g., an initial quantization parameter). In 1320, a determination is made as to whether X frames have been encoded since the last rate control, where X is a positive integer greater than one. If No, then the process returns to 1310, to continue the video teleconference is started with the same rate control parameters as before. If Yes, in 1330 a bit rate of encoded data for a primary sub-picture portion of a frame as output by a shared encoder (e.g., encoder 340B of FIG. 3) is computed. In 1340, a bit rate of encoded data for a secondary sub-picture portion of a frame as output by each non-shared encoder (e.g., encoders 340A, 340C, 340D, 340E) of FIG. 3) is computed. In 1350, the largest bit rate of encoded data for the secondary sub-picture portion of a frame as output by each non-shared encoder is determined as the maximum secondary encoded bit rate. In 1360, the bit rate of encoded data for the primary sub-picture portion of the frame is added to the maximum secondary encoded bit rate, to obtain a combined maximum bit rate for a frame. In 1370, a determination is made as to whether the combined maximum bit rate is within an acceptable bit rate range. If Yes, then in 1390, the current quantization parameter is maintained for the video teleconference, and the process returns back to the input of 1320. If No, then in 1380, rate control is adjusted such that succeeding encodings are performed by the shared encoder and non-shared encoders to be within an acceptable bit range. For example, the quantization parameter may be lowered such that a lower resolution is allocated to the encoders, so that they can operate within an acceptable bit rate range. One way to achieve this is for controller 350 to control scalers 320A, 320B, 320C, 320D, 320E such that they output lower resolution video streams, which are then composed (by composers) and encoded (by encoders) so that the video conference can operate with an acceptable bit rate range.

Another aspect of the techniques described herein is the resilience of transcoder/MCU 110 to network packet loss and how resynchronization can be performed based on errors in video-compressed frames received by participants in a video conference processed by transcoder/MCU 110. Video compression is achieved by the prediction of one frame based largely on information provided in prior transmitted, and decoded, frames. Packet loss in a transmission channel between an encoder and a decoder leads to a recipient being out of synchronization, such that the succession of frame dependencies is broken. A simple method for restoring synchronization is to transmit a keyframe that has no dependence on previous frames, and proceed from that point. The keyframe may be considered as an intra-frame, or I-frame (that is, it is not dependent on any other 'reference' frame for decoding the keyframe).

However, in video conferencing calls, which are typically both low latency and low bitrate, the size of keyframes is usually constrained to the point that although they serve the purpose of decoder refresh (resynchronization), they are a quality impairment, which needs further correction of subsequent frames to restore nominal quality. Repeated keyframes due to recurrent loss are then an impairment to video quality. When there are multiple recipients of a single encoded stream (which may include streams of multiple encoders combined together, as described above), the shared encoders of transcoder/MCU 110 need to re-synchronize when any of these recipients have experienced loss, with the resynchronization action being visible in the shared stream received by all recipients. When the only available resynchronization action is a keyframe that is of degraded quality relative to normally coded frames, the resynchronization is visible as a loss of quality to all recipients, and the rate of resynchronization is related to the aggregate loss across all recipients.

The same situation holds for a partial shared encode, such as one provided by transcoder/MCU 110 of FIG. 1, where any portion of a coded frame is sent in common to multiple participants. In several standard protocols, the signaling of loss to a source encoder is at the frame level, and thus the source encoder is unable to distinguish between loss of a packet which was part of the 'shared encoded' primary sub-picture portion or part of the 'uniquely encoded' secondary sub-picture portion of a frame. As such, the assumption is made that the loss is due to corrupted data within the encoded primary sub-picture portion of the frame, thereby necessitating a resynchronization in the shared encoder (e.g., resynchronization of encoder 340B in FIG. 3).

When the signaling between decoder and encoder also includes a per-frame acknowledgement mechanism, the encoder can build a model of which frames have been successfully received by the decoders to which the video stream is sent. The per-frame acknowledgement mechanism is where for each frame transmitted by a source encoder, a receiver (e.g., codec) provides an acknowledgement that it was able to correctly decode the encoded data. The information obtained by way of the per-frame acknowledgement mechanism can be used to resynchronize to a video frame that is known to have been successfully received by all recipients. This form of resynchronization by use of a recovery frame dependent on a known good reference frame is far less perceptible to any of the recipients, whether having experienced loss or not, and may be used to perform resynchronization of transcoder/MCU 110 of FIG. 1.

Figure 14:
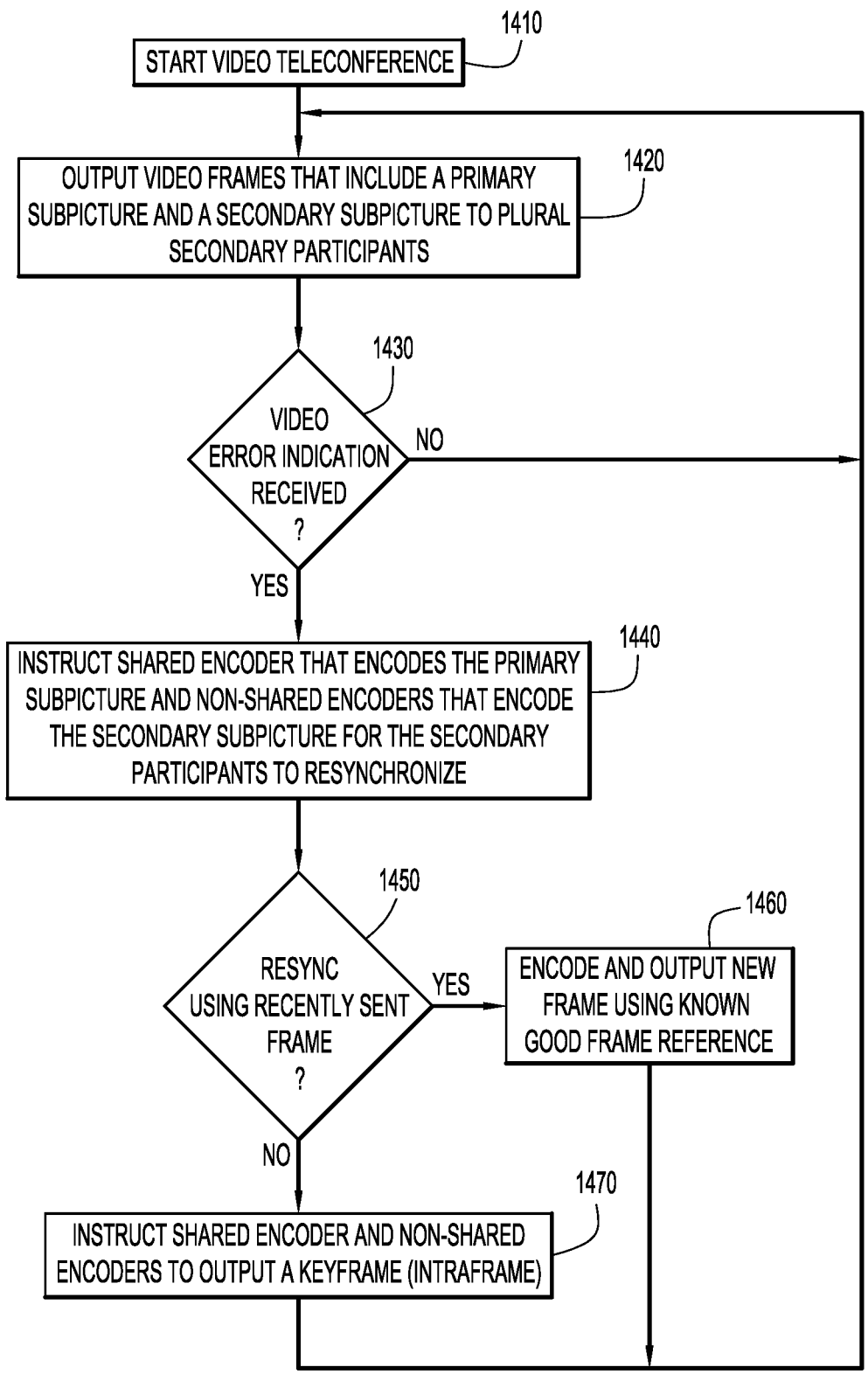
FIG. 14 is a flow diagram of a process for performing resynchronization of a video stream to participants in a video conference according to the techniques described herein.

FIG. 14 is flow diagram illustrating how resynchronizing may be performed with respect to transcoder/MCU 110, according to a technique described herein. In 1410, a video teleconference is started. In 1420, video frames are output by the transcoder/MCU 110 that each include a primary sub-picture portion and a secondary sub-picture portion. In 1430, a determination is made as to whether a video error indication has been received from a video conference participant. If No, then the process returns to 1420 to continue outputting frames of video to the participants. If Yes, then in 1440 the shared encoder and the non-shared encoders are each instructed (by controller 350 of FIG. 4) to resynchronize. In 1450, a determination is made as to whether the resynchronization is to be performed using a keyframe or a recently-sent frame as a reference frame. If resynchronization is to be performed using a known-good recently-sent frame as a reference frame, then in 1460 a new frame is encoded using the known-good reference frame, and output to each of the participants. If resynchronization is to be performed using a keyframe, then in 1470 a keyframe (e.g., an intra-frame, or I-frame) is encoded and output to each of the participants. A buffer (not shown in FIG. 4) may be provided for each encoder in the transcoder/MCU 110, for storing recently sent frames as reference frames to be used for resynchronization of a video stream.

In the transcoder/MCU of the various techniques described above, each stream generated by a split-picture multistream encoder/non-shared encoder system may be fully compliant and entirely consistent with streams that would have come from a dedicated per-participant encoder in the fully-transcoded continuous presence video conference. Also, there are no modifications required to the H.264 or H.265 bitstream syntax or the decoding process acting on these bitstreams to reconstruct the received video sequence by each of the participants that receive the split-picture multistream encoded frames according to the techniques described herein.

In some cases, the video of the secondary participant provided in the secondary sub-picture portion of a frame may not span the full width of the encoded picture, either because the secondary sub-picture portion of the frame is defined that way (as composed by the composers), or because it is not fully populated by views of secondary participants. In these instances, portions of the secondary sub-picture may be composed from the video used in the primary sub-picture portion of the frame, to provide a "background" for filling in those areas in the secondary sub-picture portion of the frame. Where common content exists across the primary-secondary sub-picture boundary, actions can be taken to ensure that any discontinuity that may result from this is not visible as an artefact. For example, the encoding process, such as the quantization parameter chosen for encoding, as well as the algorithms that make encoding choices for encoding the video, can be locally adjusted to ensure that there is minimal visible artefact at the boundary separating the primary sub-picture portion and the secondary sub-picture portion of the split-encoded frame. As one example, the encoding (e.g., video compression) performed adjacent to the boundary (e.g., for the row of macroblocks above the boundary and for the row of macroblocks below the boundary) can be performed with a greater level of quality (i.e., by changing the quantization parameter for the slices encoded at that portion of the frame to a higher bit rate) than other portions of the frame to be encoded, to thereby deal with any possible issues with respect to artefacts at the boundary portion of the frame. Further, the H.264 or H.265 deblocking processes can be applied on the boundary to smooth any residual discontinuity.

As described above, for participants to be able to decode data that has been encoded by multiple encoders and then combined into frames as if the encoded data was encoded by a single encoder, the participants receiving the video streams should have common codec characteristics in order to view a common resolution to encode and decode a common continuous presence conference layout. The constraint to a common layout removes a degree of freedom that can be offered in the full per-participant transcoded mode (e.g., a continuous presence video teleconference), which is the cost of employing a shared encode as utilized in a transcoder/MCU 110 in accordance with the techniques described above. However, the layout used to encode a video teleconference can be adapted as the number of participants change according to a specified sequence of layouts (see FIG. 12, for example), or it can be modified by a central authority, as long as the secondary participants continue to receive a common layout.

In cases where secondary participants have differing capabilities in terms of resolution or codec, the same procedures as described above with respect to a shared encoding transcoder/MCU as described above with respect to various techniques can be applied to generate sub-conferences in which participants have common codec/resolution capabilities, with partially-shared split-picture multistream encodes combined with customized secondary picture encodes providing a set of video streams for all participants requiring a particular combination of codec, resolution and bitrate. The resources required for a transcoder/MCU to implement this may be higher than if all participants were receiving a common resolution, but would still be far less than if every participant were using a unique full-frame encoder, as in a conventional fully transcoding MCU (i.e., a continuous presence video conference).

Figure 15:
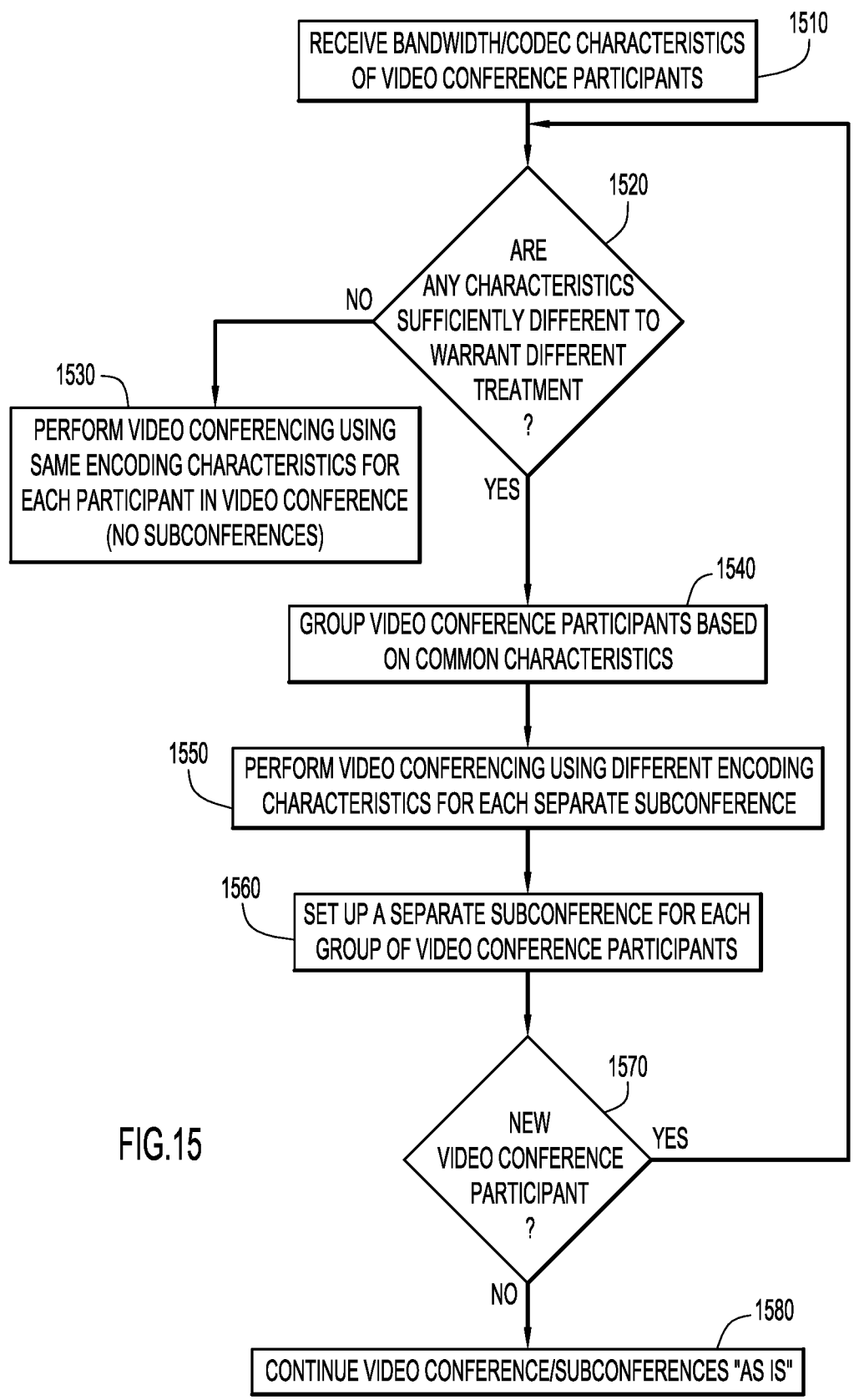
FIG. 15 is a flow diagram of a process for separating video conference participants based on common characteristics of those participants according to the techniques described herein.

FIG. 15 is a flow diagram illustrating the creation of sub-conferences in a video teleconference controlled by a shared encoding transcoder/MCU, in accordance with a technique described herein. In 1510, bandwidth and/or codec characteristics of video conference participants are received. In 1520, a determination is made as to whether any of the bandwidth and/or codec characteristics are sufficiently different to warrant different treatment. For example, if the bandwidth and/or codec characteristics are within 10% of each other, then they may be considered to be sufficiently similar (other values may be used while remaining within the spirit and scope of the techniques described herein, such as the bandwidth and/or codec characteristics being within a range of from 0% to 20% to be considered "sufficiently similar" to each other). If not, then they may be considered to be dissimilar.

If No, then in 1530 the video conference is performed using the same encoding characteristics for each participant in the video conference, with no sub-conferencing made (unless specifically requested by one or more participants to suit a particular need by those participants to have such a sub-conference). If Yes, then in 1540 video conference participants are grouped based on having same or similar bandwidth and/or codec characteristics. In 1550, each of the groups is set up into a separate sub-conference, and in 1560 the video conference is conducted with the separate sub-conferences, using different encoding characteristics for creating frames for each respective sub-conference.

In 1570, a determination is made as to whether a new video conference participant has entered (or seeks to enter) the video conference. If Yes, then the process returns back to 1520, to determine if that new video conference participant should be grouped into a particular sub-conference based on the bandwidth and/or codec characteristics of that new video conference participant. If No, then in 1580 the video conference is continued "as is." Note that the assignment of a participant to a sub-conference concerns only how the video to be sent to that participant is generated, with the use of sub-conferences a choice to optimize resources while providing good quality video within the capabilities of each participant. Regardless of sub-conference structure or assignment, each visible participant is decoded and scaled appropriately to be made visible in all sub-conferences, so that an equivalent conference experience is obtained in each sub-conference, albeit encoded with differing codecs or at differing resolutions or bitrates.

In a similar manner, sub-conferences can be made based on whether participants are to receive switched video, fully-transcoded continuous presence video, or "shared encoding" video, in which a subset of each of these different types of video can be provided to different participants in the same video conference, without causing any degradation to the video provided to each respective participant. Thus, for example, a video teleconference may include first, second and third sub-conferences, in which the first sub-conference may include three participants who receive switched video from a transcoder/MCU, the second sub-conference may include ten participants who receive continuous presence video from the transcoder/MCU, and the third sub-conference may include seven participants who receive shared encoded/non-shared encoded (split-frame) video from the transcoder/MCU. Also, each of those participants may be able to see video of the participants in the other sub-conferences that they are not a part of.

The various techniques for a multi-stream split encoding video conference system may be applied to video streams formed by temporal layering, such as video streams in which the odd frames depend on each other, but where the even-numbered frames only depend on the odd-numbered frames (and thus nothing depends on an even-numbered frame). Such video frames can be decoded, scaled, composed and encoded by a shared encoder and multiple non-shared encoders assigned to participants, in the same manner as described above.

The multi-stream split-frame encoding can be used in alternative implementations beyond video conferencing. For example, for broadcast video sent over IP networks, or on separate terrestrial broadcast channels, a primary sub-picture portion of a frame of television video may be created for all persons receiving a television channel by way of a shared encoder, and participants in a particular region (e.g., a particular country or city) may receive video created especially for them in a secondary sub-picture portion of the frame of television video by a non-shared encoder assigned to each particular region. The information in the secondary sub-picture portion of the frame created for each region may comprise a scroll line or news ticker at the bottom of the television screen that provides content pertinent to that particular region. Alternatively, the content provided in the secondary sub-picture portion of the frame can provide updated information (e.g., live or real-time video) with respect to pre-recorded content that is included in a primary sub-picture portion of the frame.

Also, a PiP may be created in a television frame by using the techniques described above, in which the PiP sets the boundary of the secondary sub-picture portion of the frame, and the rest of the frame corresponds to a primary sub-picture portion of the frame. By adhering to the 'no motion vectors in a slice crossing the boundary' criteria in the various different techniques described above, a television frame with a PiP display can be created that is tailored to a television viewer in a particular location (e.g., the PiP displays a local weather map of that region).

Figure 16:
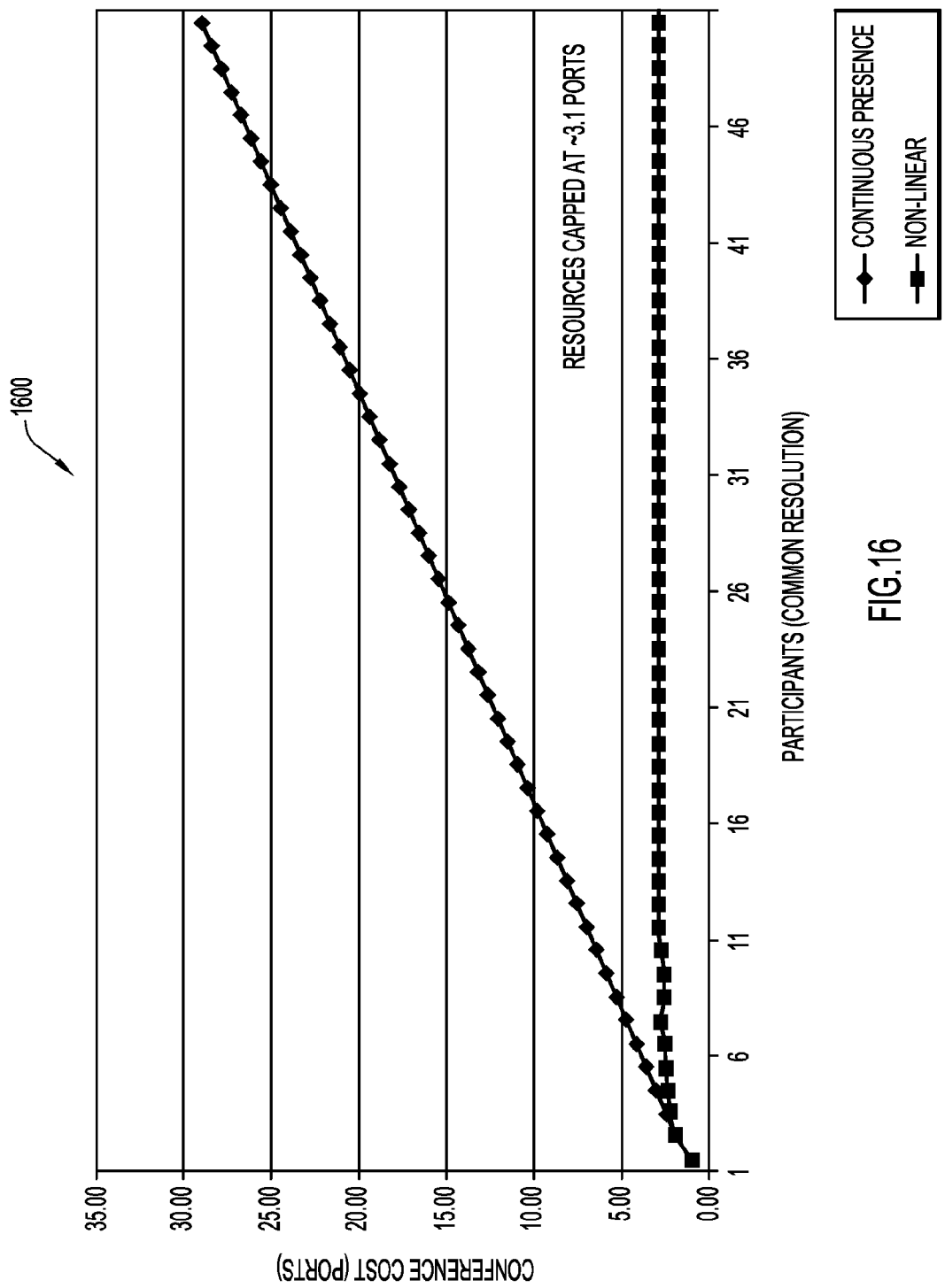
FIG. 16 is a chart showing the processing savings by using a video conferencing system that includes a transcoder/MCU with a shared encoder and plural non-shared encoders.

FIG. 16 is a chart showing the resources that may be saved by using a shared encoded/non-shared encoded (split frame) transcoder/MCU according to one or more techniques described above, as compared to a continuous presence or switched video teleconference not employing the shared/non-shared split-frame transcoder/MCU described herein. The plot of resources for the shared encoded/non-shared encoded (split frame) transcoder/MCU is based on the assumption that the encoding of a portion of a frame (e.g., 3-4% of the frame for inclusion of video of a secondary participant into a designated area within the secondary sub-portion of the frame) is proportional based on its size to the encoding required for the entire frame. Also, the plot of resources for the shared encoded/non-shared encoded (split frame) transcoder/MCU is based on the assumption that a maximum of ~10 secondary participants are to be shown in the secondary sub-portion of the frame, irrespective as to the total number of participants in a video teleconference (primary, secondary and tertiary). As can be seen from FIG. 16, resources increase linearly as the number of participants in a video teleconference that does not use the split frame techniques described above, whereas a shared encoded/non-shared encoded (split frame) transcoder/MCU of the one or more techniques described above is capped at approximately 3.1 ports (or participants). That is, after three participants join a video conference provided by a shared encoded/non-shared encoded (split frame) transcoder/MCU of the one or more techniques described above, the resources expended by the transcoder/MCU when another participant joins the video teleconference does not increase, but rather stays the same.

The plot of FIG. 16 is based on the assumption that encoding effort is approximately proportional to picture area, moderated by the content. As such, it can be expected that the encoding effort expended on a secondary participant sub-picture that is 20% of the total encoded picture area is approximately 20% of the effort required to encode the entire picture. While typically the secondary participant sub-picture is more densely populated by complex content than some regions of the primary participant sub-picture (background), it is also the case that reduced-scale views of conference participants have a smaller linear scale of motion, and the effort required to produce a good-quality encoding of the picture area is accordingly lower. A plausible model is therefore that after encoding a stream to be sent to the first of M secondary participants, comprised of a shared primary sub-picture and a secondary sub-picture specific to that participant, for one "unit" of encoding effort, each additional secondary participant re-encoding of a custom sub-picture covering x % of the total picture area would require x % of additional effort, such that encoding the remaining M−1 secondary participants requires (M−1)*x additional effort. As discussed earlier with respect to one multi-stream split-frame encoding technique, the secondary sub-picture area x tends to reduce as M increases; and so one layout model would have (M−1)*x=40% for M=3, and (M−1)*x=90% for M=9. In both cases, a full complement of M secondary streams is produced for less than double the encoding effort of a single composed continuous presence stream. Other elements of the preparation of the composed picture to be encoded also benefit from a similar saving of duplicated work, but it is the encoding effort that is computationally dominant. The above equation can be used to obtain the plot of resources expended by a multi-stream split-frame encoding transcoder/MCU as shown in FIG. 16, in which the resources expended are essentially constant as participants in number greater than 10 join the video conference.

Figure 17:
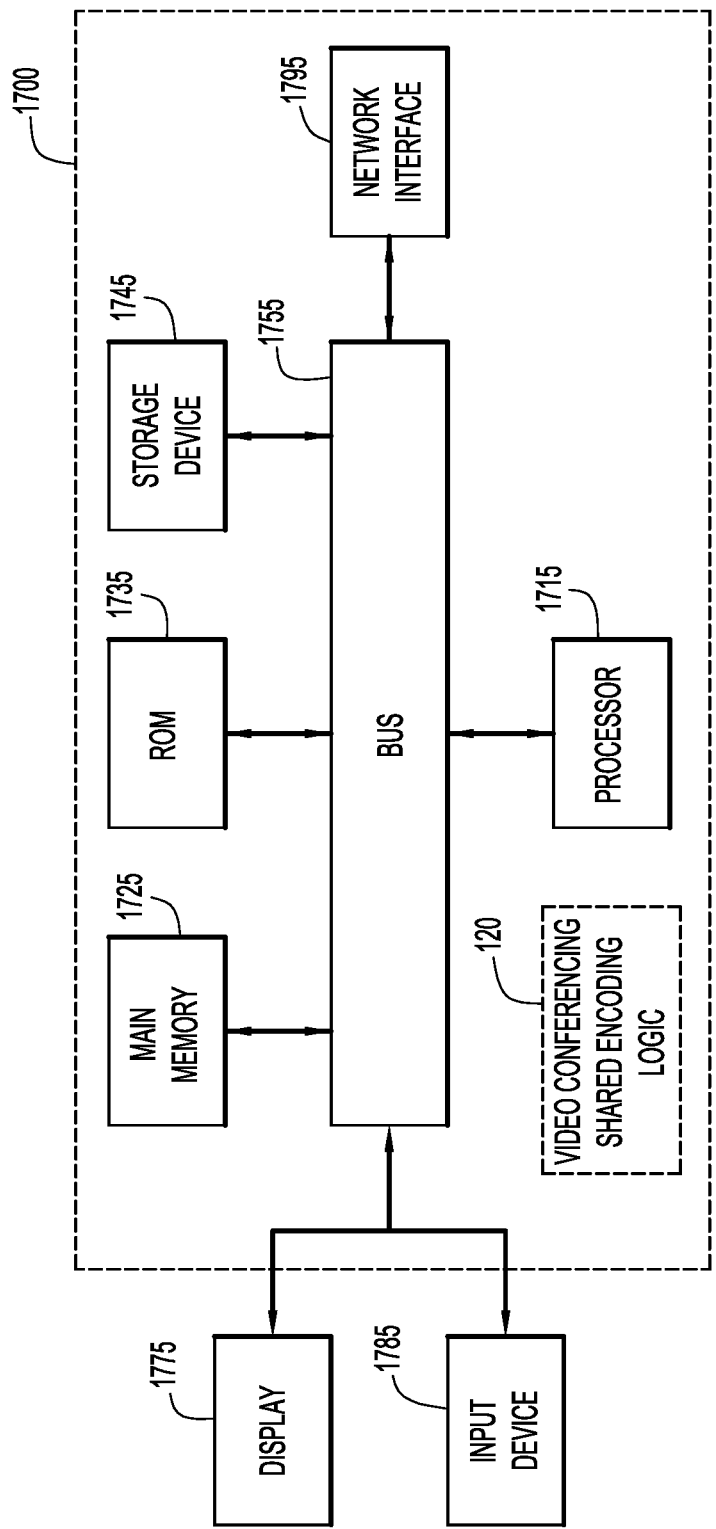
FIG. 17 is a block diagram of a computing device that may execute computer program instructions or logic for controlling a transcoder/MCU that includes a shared encoder and plural non-shared encoders according to the techniques described herein.

FIG. 17 illustrates a depiction of a computing system 1700 that can determine and perform shared encoding/non-shared encoding for a transcoder/MCU according to the techniques described above. The computing system 1700 includes a bus 1705 or other communication mechanism for communicating information and a processor 1715 coupled to the bus 1705 for processing information. The computing system 1700 communicates with a network via network interface 1795. The computing system 1700 also includes main memory 1725, such as a random access memory (RAM) or other dynamic storage device, coupled to the bus 1705 for storing information, and instructions to be executed by the processor 1715. Main memory 1725 can also be used for storing position information, temporary variables, or other intermediate information during execution of instructions by the processor 1715. The computing system 1700 may further include a read only memory (ROM) 1735 or other static storage device coupled to the bus 1705 for storing static information and instructions for the processor 1715. A storage device 1745, such as a solid state device, magnetic disk or optical disk, is coupled to the bus 1705 for persistently storing information and instructions. Video Conference Shared Encoding Logic 120, which may be stored in main memory 1725, ROM 1735 and/or storage device 1745, and which also may include some hardware logic components, is utilized by processor 1715 to perform the various techniques described above with respect to one or more implementations.

The computing system 1700 may be coupled via the bus 1705 to a display 1775, such as a liquid crystal display, or active matrix display, for displaying information to a user, such as the timestamp information of packets that have been processed by a network component that includes the computing system 1700. An input device 1785, such as a keyboard including alphanumeric and other keys, may be coupled to the bus 1705 for communicating information, and command selections to the processor 1715, such as commands entered by way of GUI 1000 in FIG. 10. In another implementation, the input device 1785 has a touch screen display 1775. The input device 1785 can include a cursor control, such as a mouse, a trackball, or cursor direction keys, for communicating direction information and command selections to the processor 1715 and for controlling cursor movement on the display 1795.

According to various implementations of the techniques described herein, the processes that effectuate illustrative implementations that are described herein can be implemented by the computing system 1700 in response to the processor 1715 executing an arrangement of instructions contained in main memory 1725. Such instructions can be read into main memory 1725 from another computer-readable medium, such as the storage device 1745. Execution of the arrangement of instructions contained in main memory 1725 causes the computing system 1700 to perform the illustrative processes described herein. One or more processors in a multi-processing arrangement may also be employed to execute the instructions contained in main memory 1725. In alternative implementations, hard-wired circuitry may be used in place of or in combination with software instructions to implement illustrative implementations. Thus, implementations are not limited to any specific combination of hardware circuitry and software.

Although example systems and methods are shown in the figures, implementations of the subject matter and the functional operations of the techniques described herein can be implemented in other types of digital electronic circuitry, or in computer software embodied in a tangible medium, firmware, or hardware, including the structures disclosed in this specification and their structural equivalents, or in combinations of one or more of them.

While many specific implementation details have been described herein, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. For example, recipient-origin control can be provided, in which recipients that experience packet loss and thus corruption of the video provided to them can request a reduction in bit rate, to thereby make the effect of packet loss less irritable to those recipients (e.g., with a reduced bit rate, one may lose one packet in every ten packets sent to the recipient, as opposed to one packet in every five packets sent to the recipient). Also, by requesting a lower bit rate, the entire video conference may benefit by the lesser total bit rate output to the collective participants. Also, in a multiple sub-conference system, participants can be moved to a sub-conference that is operating at a different resolution than the one that they are currently in, in a case where the packet loss is at a high enough level to cause disruption of the video provided to those participants. The movement of participants can be done, for example, at various join events that may include: the sending of a keyframe by the transcoder/MCU, a gradual decoder refresh (GDR) performed by the codecs, and/or when the primary participant in the video conference changes.

Also, in a multiple sub-conference system, the scalers (see FIG. 3) can be controlled by the controller 350 to output scaled decoded video at different resolutions, in which a shared encoder provided for a high resolution sub-conference may use the high resolution decoded video of a primary participant and non-shared encoders may use the high resolution decode video of secondary participants to form respective high resolution split-frames for a high resolution sub-conference, and in which a shared encoder provided for a low resolution sub-conference may use the low resolution decoded video of a primary participant and non-shared encoders may use the low resolution decode video of secondary participants to form respective low resolution split-frames for a low resolution sub-conference.

The use of a transcoder/MCU 110 according the techniques described above provides the benefits of a continuous presence video conference, but with much less processing resources as might normally be expected. This is done in a bandwidth efficient manner, and in which no new signaling schemes are necessary (e.g., H.264 and H.265 video compression protocols are supported). Also, cascading of MCUs, which is sometimes utilized in a conventional video conference as a way to combine resources from multiple MCUs to thereby handle additional participants (e.g., provide additional encoding resources to support those additional participants) is not necessary, due to the low amount of resources required to accommodate additional participants to a video conference provided by way of a transcoder/MCU 110 of the techniques described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

For example, the composers may be implemented as software "objects" that can import slice data (e.g., the encoded data of a shared encoder for composing within a primary sub-picture portion of a frame) and raw video data (e.g., decoded video for composing within a secondary sub-picture portion of a frame), in which metadata from the slices can be used to describe the spatial extent of the disposition of the slices within the composed frame. Also, as seen in FIG. 3, by having the shared encoder first encode the primary sub-picture portion of a frame, to be sent to non-shared encoders to then provide within their respective frames (for which the non-shared encoders encode video from secondary participants for inclusion in a secondary portion of their respective frames), the non-shared encoders can be provided with an early indication of the primary sub-picture portion of a frame, and match the secondary sub-picture portion of the frame that the non-shared encoders encode to it.

Further, as described above, a transcoder/MCU according to the techniques described above can relatively easily accommodate additional participants into a video conference that is currently taking place, since the processing load associated with the additional participant is minimal (see FIG. 16). Also, video conference participants can be pooled, or grouped, into separate sub-conferences, in which low capability or high loss of one or more participants can be resolved by placing those participants into a sub-conference with a lower resolution criteria than other sub-conferences or the main conference.

Still further, in some circumstances slice data for a greater part of the primary sub-picture portion of a frame may be switched from a source, in which locally encoded data is spliced to cover the secondary participant sub-picture. In this instance, a source encoder of a participant in a video conference is not aware of the sub-picture structure as created by the transcoder/MCU. In one possible implementation, the slice data covering the majority of the primary sub-picture portion of a frame is spliced with new slice data coded for the remainder of the primary sub-picture portion and the secondary sub-picture portion of the frame. As a result, slice-splicing is performed in the creation of frames, in which the primary sub-picture is switched from the source encoder of a participant (e.g., the primary participant), without being re-encoded by the transcoder/MCU, but in which the primary sub-picture is spliced with individually encoded secondary sub-pictures. This is possible where the source encoder slice structure is well-suited to the definition of a sub-picture boundary; one example of such is where a slice is defined for every whole macroblock row, such that no slice extends across more than one macroblock row; such slices are guaranteed not to cross a row-aligned sub-picture boundary. In another implementation, the source encoder is informed of the sub-picture structure of frames created by the transcoder/MCU (e.g., the boundary position), and in which the source encoder of a video conference participant includes this in the slice structure of the video that it contributes to a part-switched/part-transcoded video conference. This can be done via proprietary agreement or via a standardized protocol on how video is to be used. It can also be done without changing the slice structure, by negotiating the source encoder to contribute video of exactly the right resolution to fill the primary sub-picture portion of frames that will be then further processed by the transcoder/MCU to provide a full frame that includes video in a primary sub-picture portion and in a secondary sub-picture portion of the frame. This provides for a hybrid split screen/multi-stream encoding system that has the 'goodness' of switching of the video of the primary participant (e.g., original encode quality, low latency), with the specialization of streams (e.g., the secondary participants shown to participants in the secondary sub-picture portions of frames), to provide 'continuous presence-like' video in a single stream with no self-view.

The above description is intended by way of example only.

What is claimed is:

1. A method, comprising:
   receiving a stream of video slices from a participant;
   designating the video slices as a primary sub-picture of a frame of video;
   encoding, with a first encoder, a first secondary sub-picture to obtain an encoded first secondary sub-picture for the frame of video;
   encoding, with a second encoder, a second secondary sub-picture to obtain an encoded second secondary sub-picture for the frame of video;
   combining the primary sub-picture with the encoded first secondary sub-picture to obtain a first video stream;
   combining the primary sub-picture with the encoded second secondary sub-picture to obtain a second video stream; and
   transmitting the first and second video streams to respective recipients,
   wherein the video slices are not further encoded by an encoder, and
   wherein the video slices from the participant, the first secondary sub-picture and the second secondary sub-picture are received, respectively, from different participants.

2. The method of claim 1, wherein combining the primary sub-picture with the encoded first secondary sub-picture to obtain a first video stream comprises splicing the primary sub-picture with the encoded first secondary sub-picture.

3. The method of claim 1, further comprising informing a source encoder that generates the stream of video slices of a sub-picture structure of the frame of video.

4. The method of claim 1, further comprising informing a source encoder that generates the stream of video slices of a resolution sufficient to fill the primary sub-picture of the frame of video.

5. The method of claim 1, wherein the participant does not receive the first or the second video streams.

6. The method according to claim 1, further comprising:
   determining a number of secondary recipients to be displayed with a primary recipient within respective frames provided to a plurality of displays of the plurality of secondary recipients; and
   based on the determining, setting a boundary within the respective frame for each of the recipients, the boundary separating a primary sub-picture portion of the respective frame that includes video of the primary recipient and a secondary sub-picture portion of the respective frame that includes video of one or more of the secondary recipients.

7. The method of claim 1, wherein transmitting comprises:
   including at least one slice representing the first video stream and at least one slice representing the second video stream in one or more packets to respective recipients; and
   transmitting the one or more packets to the respective recipients.

8. The method of claim 7, wherein the at least one slice representing the first video stream and the at least one slice representing the second video stream are included in a payload portion of the one or more packets.

9. An apparatus comprising:
   a network interface unit configured to enable communications via a network;
   a memory configured to store logic instructions; and
   at least one processor, when executing the logic instructions, configured to:
     receive a stream of video slices from a participant;
     designate the video slices as a primary sub-picture of a frame of video;
     encode, with a first encoder, a first secondary sub-picture to obtain an encoded first secondary sub-picture for the frame of video;
     encode, with a second encoder, a second secondary sub-picture to obtain an encoded second secondary sub-picture for the frame of video;
     combine the primary sub-picture with the encoded first secondary sub-picture to obtain a first video stream;
     combine the primary sub-picture with the encoded second secondary sub-picture to obtain a second video stream; and
     transmit the first and second video streams to respective recipients,
     wherein the video slices are not further encoded by an encoder, and wherein the video slices from the participant, the first secondary sub-picture, and the second secondary sub-picture are received, respectively, from different participants.

10. The apparatus of claim 9, wherein the processor is configured to combine the primary sub-picture with the encoded first secondary sub-picture to obtain a first video stream by splicing the primary sub-picture with the encoded first secondary sub-picture.

11. The apparatus of claim 9, wherein the processor is configured to inform a source encoder that generates the stream of video slices of a sub-picture structure of the frame of video.

12. The apparatus of claim 9, wherein the processor is configured to inform a source encoder that generates the stream of video slices of a resolution sufficient to fill the primary sub-picture.

13. The apparatus of claim 9, wherein the processor is configured to not transmit the first or the second video streams to the participant.

14. A non-transitory tangible computer readable storage media encoded with instructions that, when executed by at least one processor, is configured to cause the processor to:
  receive a stream of video slices from a participant;
  designate the video slices as a primary sub-picture of a frame of video;
  encode, with a first encoder, a first secondary sub-picture to obtain an encoded first secondary sub-picture for the frame of video;
  encode, with a second encoder, a second secondary sub-picture to obtain an encoded second secondary sub-picture for the frame of video;
  combine the primary sub-picture with the encoded first secondary sub-picture to obtain a first video stream;
  combine the primary sub-picture with the encoded second secondary sub-picture to obtain a second video stream; and
  transmit the first and second video streams to respective recipients,
  wherein the video slices are not further encoded by an encoder, and
  wherein the video slices from the participant, the first secondary sub-picture and the second secondary sub-picture are received, respectively, from different participants.

15. The non-transitory tangible computer readable storage media of claim 14 encoded with instructions that, when executed by at least one processor, is further configured to cause the processor to:
  combine the primary sub-picture with the encoded first secondary sub-picture to obtain a first video stream by splicing the primary sub-picture with the encoded first secondary sub-picture.

16. The non-transitory tangible computer readable storage media of claim 14 encoded with instructions that, when executed by at least one processor, is further configured to cause the processor to:
  inform a source encoder that generates the stream of video slices of a sub-picture structure of the frame of video.

17. The non-transitory tangible computer readable storage media of claim 14 encoded with instructions that, when executed by at least one processor, is further configured to cause the processor to:
  inform a source encoder that generates the stream of video slices of a resolution sufficient to fill the primary sub-picture.

18. The non-transitory tangible computer readable storage media of claim 14 encoded with instructions that, when executed by at least one processor, is further configured to cause the processor to:
  not transmit the first or the second video streams to the participant.

* * * * *

UNITED STATES PATENT AND TRADEMARK OFFICE
CERTIFICATE OF CORRECTION

PATENT NO. : 9,781,387 B2  
APPLICATION NO. : 15/089649  
DATED : October 3, 2017  
INVENTOR(S) : Paul G. Bright-Thomas Page 1 of 1

It is certified that error appears in the above-identified patent and that said Letters Patent is hereby corrected as shown below:

In the Claims

In Column 31, Line 17, insert --of the frame of video-- after "sub-picture".

In Column 32, Line 29, insert --of the frame of video-- after "sub-picture".

Signed and Sealed this  
Thirteenth Day of March, 2018

Andrei Iancu  
*Director of the United States Patent and Trademark Office*